United States Patent [19]

Takatori et al.

[11] Patent Number: 5,381,097
[45] Date of Patent: Jan. 10, 1995

[54] LIQUID LEAKAGE DETECTOR LINE

[75] Inventors: Taizo Takatori, Nara; Akihiro Ishihara, Tondabayashi; Tadaaki Masui, Osaka; Yoshinori Kawakami, Nara; Takahisa Okumura; Masuo Ishizaka, both of Higashiosaka, all of Japan

[73] Assignee: Tatsuta Electric Wire & Cable Co., Ltd., Higashiosaka, Japan

[21] Appl. No.: 22,913

[22] Filed: Feb. 26, 1993

[30] Foreign Application Priority Data

| Feb. 28, 1992 | [JP] | Japan | 4-019300 |
| Feb. 28, 1992 | [JP] | Japan | 4-019301 |
| Feb. 28, 1992 | [JP] | Japan | 4-019302 |
| Mar. 25, 1992 | [JP] | Japan | 4-025441 |
| Mar. 25, 1992 | [JP] | Japan | 4-025442 |
| Nov. 30, 1992 | [JP] | Japan | 4-345606 |
| Nov. 30, 1992 | [JP] | Japan | 4-345607 |
| Dec. 29, 1992 | [JP] | Japan | 4-360373 |

[51] Int. Cl.⁶ .................................. G01R 31/08
[52] U.S. Cl. .................................. 324/512; 324/555; 73/40; 174/47
[58] Field of Search ............... 324/512, 525, 527, 555, 324/557; 73/40; 204/401; 174/47; 422/82.01; 29/868

[56] References Cited

U.S. PATENT DOCUMENTS

| 4,090,763 | 5/1978 | Congdon et al. | 439/606 |
| 4,706,713 | 11/1987 | Sadamitsu et al. | 138/137 |
| 4,771,246 | 9/1988 | Boryta et al. | 324/559 |
| 4,918,977 | 4/1990 | Takahashi et al. | |
| 4,926,129 | 5/1990 | Wasley et al. | 324/555 |
| 5,101,657 | 4/1992 | Lahlouh et al. | 73/40 X |
| 5,140,847 | 8/1992 | Tausch et al. | 73/40 |
| 5,177,996 | 1/1993 | Sahakian | 73/40 |
| 5,204,928 | 4/1993 | Konda et al. | 385/128 |

FOREIGN PATENT DOCUMENTS 0262667 4/1988 European Pat. Off. .
56-6133 1/1981 Japan .

Primary Examiner—Kenneth A. Wieder
Assistant Examiner—Glenn W. Brown
Attorney, Agent, or Firm—Oblon, Spivak, McClelland, Maier & Neustadt

[57] ABSTRACT

A liquid leakage detector line is provided with a coating layer having at least liquid-absorbent properties and disposed at the outer periphery of a core which contains a pair of wiry electrodes disposed nearly parallel with each other, wherein the wiry electrodes comprise conductors which are extrusion coated with a polyester elastomer as an insulator. The liquid leakage detector line has excellent mechanical strength, rubber elasticity, resistance to fatigue from flexing and crack propagation resistance, and is free from the occurrence of pinholes, crazings, etc. inside the insulator during production and laying due to external forces applied to the wiry electrodes, such as pressure, tensile force, bending, and the like. As a result, erroneous actuation due to rainfall, etc. does not occur, and the time required to detect the sulfuric acid or other liquid to be detected has little dependence on the temperature, and short detection times for leaking liquid are possible even at low temperatures.

18 Claims, 23 Drawing Sheets

LIQUID LEAKAGE DETECTOR LINE

BACKGROUND OF THE INVENTION

1. Field of the Invention

The present invention relates to a liquid leakage detector line for detecting the leakage of a liquid such as sulfuric acid, caustic soda, etc., resulting from damages of a transportation pipe line or a storage tank for such liquid.

2. Description of the Prior Art

The present applicant has previously proposed a liquid leakage detector line capable of detecting a wide range of types of liquid leakage, which is used by being installed along a transportation pipe line or a storage tank for such liquid such as sulfuric acid, caustic soda, etc. (Japanese Utility Model Law Application Disclosures SHO 63-57544 to SHO 63-57549). Such a liquid leakage detector line comprises wiry electrodes, consisting of a pair of enamel wires coated with a polyester resin on the conductor for insulation, disposed nearly parallel with each other, and a braided body layer, consisting of at least liquid-absorbent yarn, disposed at the outer periphery of said wiry electrodes.

In such a liquid leakage detector line, leaking liquid such as sulfuric acid, etc. is absorbed by a braided body layer made of liquid-absorbent yarn, and the sulfuric acid, etc. which soaks through the braided body layer dissolves the insulator layer, causing a short-circuit or near short-circuit between a pair of conductors in the wiry electrodes. Thus, detection of leaking liquid is possible by measuring the insulation resistance between the conductors at one end of the liquid leakage detector line. Even when normal rainwater or the like penetrates the liquid leakage detector line, it does not dissolve the insulator layer, and therefore does not cause erroneous actuation.

However, since in a conventional liquid leakage detector line as described above, the insulator layer of the wiry electrode is formed by a so-called enamel coating produced by baking finish of a polyester resin, crazings and cracks can occur during production and laying, due to stress produced inside the insulation layer by external forces applied to the wiry electrodes, such as pressure, tensile force, bending, and the like. As a result, it has been necessary to take a great deal of care during the processes of production and laying, so that external forces do not overly affect the liquid leakage detector line. Such attention is limited, however, and when rainwater and the like seep through the inevitably produced cracks, etc., it creates the problem of erroneous actuation of the liquid leakage detector line. Also, in an enamel coated liquid leakage detector line, the time required for detection of sulfuric acid, etc. is largely dependent on the temperature, and a particular problem occurs when the temperature falls to 15° C. or below, at which the detection time is drastically increased.

In addition, when leakage of liquid is detected, it is necessary to detect the location thereof in order to pinpoint the leakage site and repair it as soon as possible, but there has been no appropriate means of detecting the location of leakage when the area of detection is wide, such as in a liquid leakage detector line along a transportation pipeline for sulfuric acid, etc. For example, a liquid leakage detector line capable of pinpointing the location of leakage is known, wherein a high-resistance wire is constructed along the above mentioned wiry electrodes, whose resistance per unit length is higher than said wiry electrodes (Japanese Patent Application Publication HEI 2-43130), In FIG. 26, X and Y represent a pair of wiry electrodes, and Z represents a high-resistance wire. Each of the resistance values per unit length are indicated by x,y and z, respectively, and each of the near-end terminals are indicated by NX, NY and NZ, respectively. The loop resistance $R_{xy}$ from $N_x$ to $N_y$ via the location of liquid leakage P, and the loop resistance $R_{yz}$ from $N_y$ to $N_z$ the same location of liquid leakage P, are measured using a constant-voltage power supply V and an amperemeter A, by which the length L from the near-end to the location of liquid leakage may then be approximated using the following equation. A nichrome wire or the like may be used as the high-resistance wire.

$$L=(R_{YZ}-R_{XY})/(z-x)$$

The above mentioned liquid leakage detector line is excellent when used as a liquid leakage location detector, but since high-resistance wires are generally rigid, the flexibility and bending resistance of the liquid leakage detector line are reduced. Thus, when installed along a pipeline for sulfuric acid, etc. they are hard to bend and consequently difficult to work with, and if bending is repeatedly forced, the problem of breakage of the high-resistance wires occurs. Further, if for some reason a wiry electrode is broken, detection of liquid leakage becomes impossible at the far end from the breakage site. Rapid detection of the location of breakage and repair thereof is of course necessary, but heretofore there has been no appropriate means of detection of the location of breakage in cases where the area of detection is long. An example of a liquid leakage detector line capable of detection of both the location of leakage and the location of breakage is shown in FIG. 27 (Japanese Utility Model Law Application Publication HEI 2-47539). This liquid leakage detector line possesses a pair of wiry electrodes $3a,3b$ and a determined number of location detesting insulated element wires $13_1, 13_2 \ldots$, the wiry electrode $3a$ is connected with the other wiry electrode $3b$, the location detecting insulated element wires $13_1, 13_2 \ldots$ at the far-end terminal, respectively through resistors $R_0, R_1 \ldots$, having approximately the same resistance.

Further, one of the wiry electrodes is divided into specific sections $A_1, A_2 \ldots$, and the points of division $P_1, P_2 \ldots$ are cross-connected with the above mentioned location detector insulation coated element wires $13_1, 13_2 \ldots$ for each section. From the near-end terminal, measurement is made of the resistance value between the wiry electrode $3a$ and the other wiry electrode $3b$ and the location detector insulation coated element wires $13_1, 13_2 \ldots$. If this value does not exceed a certain standard value L1, the problem is judged to be a liquid leakage, whereas if the value is equal to or greater than another standard value L2, the problem is judged to be a breakage.

If then, for example, the resistance value between the wiry electrode $3a$ and a location detector insulation coated element wire $13_1$ does not exceed the standard value L1, a liquid leakage is judged to exist in section A1, and if the resistance value between the wiry electrode $3a$ and a location detector insulation coated element wire $13_2$ is equal to or greater than the standard value L2, then a breakage is judged to exist in section A2.

Thus, according to the liquid leakage detector line described in Japanese Utility Model Law Application Publication HEI 2-47539 mentioned above, detection of both leaking sections and broken sections is possible. However, in cases involving detection of liquid leakage from a pipeline for sulfuric acid, etc. which spans a long distance, there must be arranged a large number of sections and consequently a large number of insulation coated wires of the liquid leakage detector line, and the increased number of meters or terminals lowers economic feasibility, while production and operation of the detector line itself becomes more complicated.

SUMMARY OF THE INVENTION

In order to overcome the disadvantages mentioned above, the present invention aims to provide, as its primary object, a liquid leakage detector line with little variation in detection time due to temperature, in order to eliminate erroneous actuation caused by crazings, cracks, etc.

Also, as a second object, it provides a liquid leakage detector line capable of detecting the location of liquid leakage, without reducing the flexibility and bending-resistance thereof.

Further, as a third object, the present invention aims to provide a liquid leakage detector line capable of detecting not only the location of leakage but also the location of breakage, keeping to a minimum the number of insulation coated element wires which must be installed, even in cases where the area of detection is long.

In order to achieve the primary object mentioned above, a liquid leakage detector line according to the present invention is characterized by comprising a waterproof and liquid-absorbent coating layer constructed at the outer periphery of a core containing a pair of wiry electrodes disposed nearly parallel to each other, wherein each of said wiry electrodes is composed of an extrusion coating of thermoplastic polyester elastomer on the conductor as the insulator. Here, the thermoplastic polyester elastomer (hereunder referred to as "polyester elastomer") consists of a hard segment and a soft segment, the hard segment being a thermoplastic elastomer made of polyester, and the soft segment being a polyether or a polyester. Examples where the hard segment is a polyester and the soft segment is a polyether include "Hittel" (product of TORAY/Dupont, Inc.), "Perplen-P" (product of TOYOBO, Inc.) and "Lomod" (product of NIPPON GE PLASTIC CO., LTD.), etc. Examples where the hard segment is a polyester and the soft segment is a polyester include "Perplen-S" (product of TOYOBO, Inc.) and "ARINTEL-S" (product of NIPPON GE PLASTIC CO., LTD.).

In a liquid leakage detector line constructed in the manner described above, the polyester elastomer which forms the insulator for the wiry electrodes has particularly excellent mechanical strength, rubber elasticity, resistance to fatigue from flexing and crack propagation resistance over a wide range of low and high temperatures. Therefore, there is no fear of pinholes, crazings due to or partially due to external forces applied to the wiry electrodes, such as pressure, tensile force, bending, etc., during the processes of production and laying. In addition, the time required for detection of sulfuric acid or other liquid to be detected is largely independent of the temperature. The purpose of the liquid-absorbent coating layer is to lead the leaking liquid to the interior of the detector line and make the insulation layer of the wiry electrode more soluble. Various constructions thereof are described below, Also, in order to achieve the second object mentioned above, a liquid leakage detector line according to the present invention is characterized by comprising a pair of wiry electrodes consisting of an extrusion coating of a thermoplastic polyester elastomer on a flexible conductor, having at least a liquid-absorbent coating layer on the outer periphery of a core which contains the pair of wiry electrodes, and having impedance elements which are connected in series to one of the wiry electrodes at each prescribed section.

According to a liquid leakage detector line constructed in the manner described above, it is possible to determine the section in which liquid leakage occurs, by calculating the voltage drop corresponding to the number of sections of the wiry electrode from the site which is short-circuited by the leaking liquid to the near-end or the far-end therefrom, and the impedance value of the impedance element.

Further, in order to achieve the third object mentioned above, a liquid leakage detector line according to the present invention is characterized by comprising a pair of wiry electrodes consisting of an extrusion coating of a thermoplastic polyester elastomer on a conductor, having at least a liquid-absorbent coating layer on the outer periphery of a core which contains the pair of wiry electrodes, and having constant current circuits which are connected in a parallel fashion to the wiry electrode at each prescribed section therein to generate a fixed current in the same direction.

According to a liquid leakage detector line constructed in the manner described above, the polarity of the direct-current generated to the detection line when leakage of liquid is detected is set to that which does not allow for the flow of current to the constant current circuit, and it is therefore possible to determine the section in which the leakage occurs by measuring the voltage drop corresponding to the number of sections of the wiry electrode from the site which is short-circuited by the leaking liquid to the near-end or the far-end therefrom and the resistance value of the resistance element. Also, when a breakage site is to be detected, the polarity is reversed to cause the current to flow in the constant current circuits which are connected in parallel for each of the predetermined number of sections, and it is therefore possible to determine in which section breakage has occurred by measuring the amount of current flowing to the breakage site between the pair of wiry electrodes, through the constant current circuits placed every predetermined number of sections as described above, in terms of, for example, voltage.

DETAILED DESCRIPTION OF THE PREFERRED EMBODIMENTS

Figure 1:
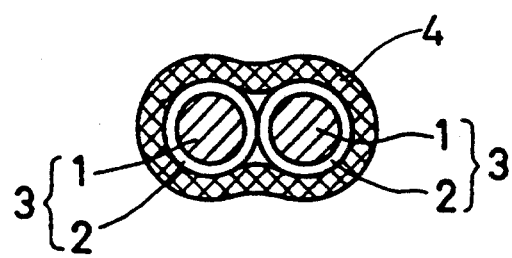
FIGS. 1-6 are sectional views of an example of a liquid leakage detector line according to the present invention.
Figure 2:
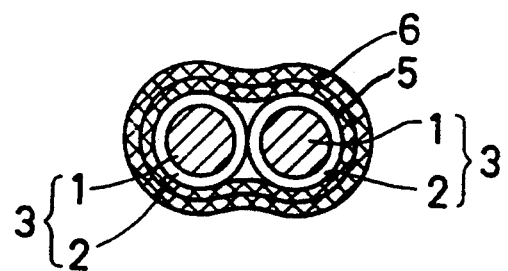

An explanation of the present invention is given below with reference to the drawings. FIGS. 1 and 2 are sectional views of a liquid leakage detector line according to the present invention.

The liquid leakage detector line in FIG. 1 has a single coating layer, and in this figure, 1 indicates a conductor having a circular section, 2 indicates an insulator layer coated on the conductor 1, and a pair of wiry electrodes 3, 3 are composed thereof, generally parallel to each other (they may also be twisted around each other). 4 indicates a liquid-absorbent coating layer constructed on the outer periphery of the pair of wiry electrodes 3,3. The liquid leakage detector line in FIG. 2 is identical to that shown in FIG. 1, except that its coating layer consists of two layers, an inner layer 5 and an outer layer 6.

The insulator 2 of the liquid leakage detector lines in FIGS. 1 and 2 may employ any of the polyester elastomers described previously.

Figure 7:
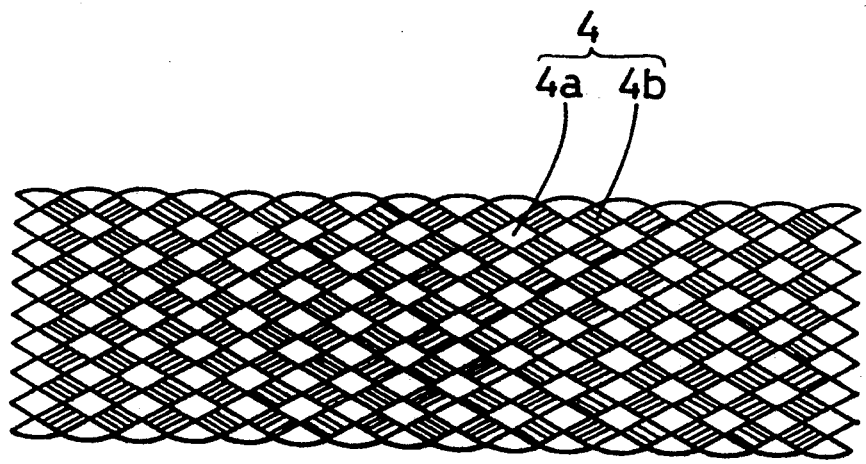
FIG. 7 and 8 are construction drawings of an embodiment of a coating layer of the liquid leakage detector line.

The coating layer 4 in FIG. 1 may be a liquid-absorbent layer, and is preferably a braided body layer made of waterproof liquid-absorbent yarn. The waterproof liquid-absorbent yarn used may be for example, a black multi-filament yarn made of polyester or other fiber such as Tetron, etc. Also, as shown in FIG. 7, it may be a braided body layer of a group 4a consisting of waterproof liquid-absorbent yarn as mentioned above and a group 4b consisting of waterproof non-absorbent yarn such as, for example, a mono-filament polyethylene yarn, both being arranged alternately. In such a case, each of the yarns is preferably black, for better weatherproofing.

According to the liquid leakage detector line in FIG. 1, leaking liquids such as sulfuric acid, caustic soda, or the like are absorbed and maintained by the braided body layer 4 which is liquid-absorbent and dissolves in the liquid to be detected. The sulfuric acid or other leaking liquid also dissolves the insulator 2, creating a short-circuit or near short-circuit to occur between the pair of conductors 1,1 of the wiry electrode 3, allowing detection of the leaking liquid. If, as shown in FIG. 7, the braided body layer 4 is a braided body layer of a group 4a consisting of waterproof liquid-absorbent yarn arranged alternately with a group 4b consisting of waterproof non-absorbent yarn, then the variation in detection time is reduced to a minimum.

Figure 8:
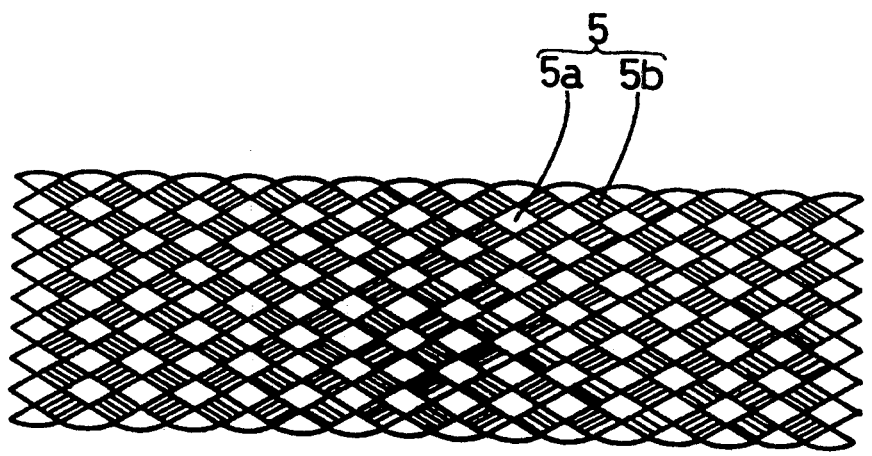

The inner layer 5 of the liquid leakage detector line in FIG. 2 may be one which leads the liquid to be detected absorbed by the outer layer 6 to the surface of the insulator and maintains it thereon, and it may employ a braided body consisting of, for example, a non-absorbent yarn which does not dissolve in the liquid to be detected (hereunder referred to as "non-liquid-soluble yarn"). This non-liquid-soluble, non-absorbent yarn may be, for example, a mono-filament yarn made of a fiber such as polyethylene, polypropylene, etc. Further, if, as shown in FIG. 8, the braided body layer is a braided body layer of a group 5a consisting of a non-absorbent yarn which does not dissolve in the liquid to be detected and a group 5b consisting of yarn which does dissolve in the liquid to be detected (hereunder referred to as "liquid-soluble yarn"), then variations in detection time is reduced to a minimum.

The outer layer 6 of the liquid leakage detector line in FIG. 2 may be a braided body, etc. constructed in the same manner as the coating layer in FIG. 1. This outer braided body layer 6 functions as a mechanical protection, for example, to alleviate the pressure exerted on the insulator 2 of the wiry electrodes 3 via the inner braided body layer 4 at the tied sections, etc.

According to the liquid leakage detector line in FIG. 2, leaking liquid such as sulfuric acid or the like is first absorbed by the liquid-absorbent, liquid-soluble outer braided body layer 6, and is then led to the inner braided body 5. The leaking liquid is absorbed into the multi-filament yarn 5b, which dissolves therein. However, since the mono-filament yarn 5a maintains its lattice form, the leaking liquid which has dissolved the multi-filament yarn 5b then dissolves the insulator 2 while being maintained by the lattice, and creates a short-circuit or near short-circuit to occur between the pair of conductors 1,1 of the wiry electrodes 3, allowing detection of the leaking liquid.

The outer braided body 6 is black for weatherproofing, and therefore this outer braided body 6 absorbs ultraviolet and other rays from the sun, helping to prevent changes through time in the non-liquid-soluble, non-absorbent yarn 5a of the inner braided body 5. Also, the black outer braided body 6 and the group consisting of liquid soluble, liquid-absorbent yarn 5b of the inner braided body 5 are dissolved at the site of liquid leakage, leaving only the group 5a consisting of the non-liquid-soluble, non-absorbent white yarn. As a result, the white color of the non-liquid-soluble, non-absorbent yarn 5a which remains at the site of liquid leakage may be clearly seen against the black color of the outer braided body 6 at the periphery of the site of liquid leakage, allowing for easy discovery of the site.

FIGS. 3-6 are sectional views of separate examples of a liquid leakage detector line according to the present invention, wherein a spacer 7 (7a or 7b) is provided to maintain a minute gap between the wiry electrodes which consists of a liquid-soluble member. Since all of the insulators are made of a polyester elastomer, there is very little danger of occurrence of pinholes, crazings etc. due to or partially due to external forces such as pressure, tensile forces, bending, etc. acting upon the wiry electrodes during the production process or at the time of laying. However, such danger is further reduced by providing a spacer 7 therein as a buffer. For example, if by chance damage or pinholes should occur in the insulator of the wiry electrodes, there is very little probability of the electrical resistance value between the wiry electrodes falling below the standard value due to rainfall or the like, since a minute gap is maintained between the wiry electrodes 3,3.

Figure 3:
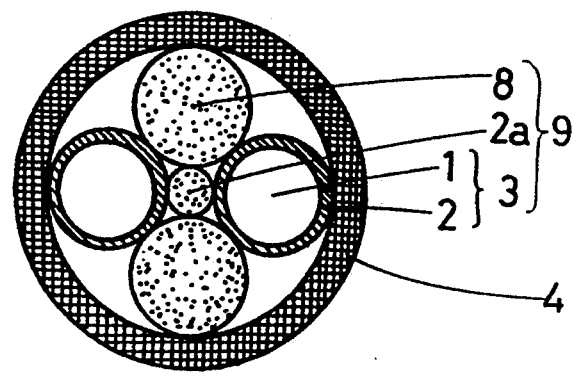
Figure 4:
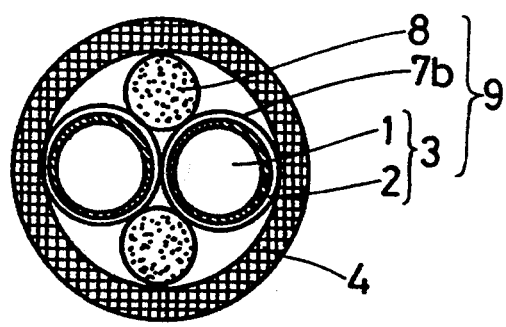
Figure 5:
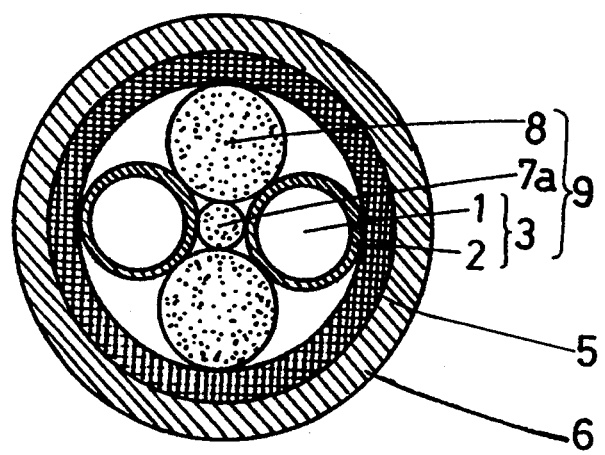
Figure 6:
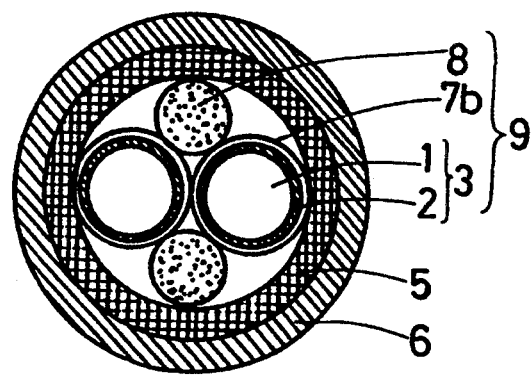

The detector lines in FIGS. 3 and 4 are similar to that in FIG. 1 in that they comprise a coating layer composed of a single braided body, while the detector lines in FIGS. 5 and 6 are similar to that in FIG. 2 in that they comprise a double coating layer consisting of an inner braided body and an outer braided body.

In the detector lines in FIGS. 3 and 5, 7a represents a small-diameter spacer provided between the pair of wiry electrodes 3,3, and 8 represents a large-diameter inclusion disposed adjacent to the wiry electrodes 3 and the spacer 7a. Also, the wiry electrodes 3, the spacer 7a and the inclusion 8 are disposed nearly parallel to each other, or are twisted around each other to form a core 9.

The constructions of the wiry electrodes 3, the coating layer 4, the inner layer 5 and the outer layer 6 are identical to those in FIGS. 1 and 2 described previously, and are indicated by the same numbers.

In FIGS. 3 and 5, the spacer 7a is a small-diameter piece which is waterproof and dissolves in the liquid to be detected, and may be, for example, a polyester cord. This spacer 7a creates a minute gap between the pair of wiry electrodes 3.

The inclusion 8 serves to make the core 9 nearly circular, and may be, for example, a polyester cord. In the examples represented in the diagrams, the inclusion 8 has approximately the same diameter as the wiry electrodes 3, and the wiry electrodes 3 and the inclusion 8 are twisted together in a star shape around the spacer 7a as the center.

FIGS. 4 and 6 are section views of liquid leakage detector lines according to other examples, They differ from the examples in FIGS. 3 and 5 in that they have a spacer 7b made of waterproof tape which dissolves in the liquid to be detected, wound around the wiry electrodes 3, in place of the small-diameter spacer 7a between the pair of wiry electrodes 3,3. As the tape is liquid-soluble, it does not prevent the leaking liquid from reaching the wiry electrodes 3. Such a tape may be, for example, a polyester tape. The minute gap between the pair of wiry electrodes 3 may thus be easily adjusted by changing the thickness of the tape itself and the density of the wrapping. Also, since it is only necessary to maintain the minute gap between the pair of wiry electrodes 3, the tape need only be affixed to one of the wiry electrodes 3.

An explanation will now be given regarding the results of measurement of sulfuric acid leakage detectability listed in Tables 1-6, for Examples 1-12 according to the present invention and Comparisons 1-12.

TABLE 1

| | | Example 1 | Example 2 | Comparison 1 | Comparison 2 |
|---|---|---|---|---|---|
| Conductor | Material | annealed copper wire | annealed copper wire | annealed copper wire | annealed copper wire |
| | Construction | 0.65 mm each | 0.65 mm each | 0.65 mm each | 0.65 mm each |
| | Standard outer diameter | 0.65 mm | 0.65 mm | 0.65 mm | 0.65 mm |
| Insulator | Material | Hitrel 2751 | Perplen S-9002 | terephthalic polyhydric alcohol varnish | terephthalic polyhydric alcohol varnish |
| | Coating method | extrusion | extrusion | paint baking | paint baking |
| | Standard thickness | 0.040 | 0.040 | 0.020 | 0.045 |
| | Standard outer diameter | 0.73 mm | 0.73 mm | 0.69 mm | 0.74 mm |
| Twisting | Direction | clockwise | clockwise | clockwise | clockwise |
| | Pitch | 22 mm | 22 mm | 22 mm | 22 mm |
| | Standard outer diameter | 1.46 mm | 1.46 mm | 1.38 mm | 1.48 mm |
| Braiding | Material | Tetron yarn (black), 100 denier double yarn | Tetron yarn (black), 100 denier double yarn | Tetron yarn (black), 100 denier double yarn | Tetron yarn (black), 100 denier double yarn |
| | Strings × Reels | 4 × 16 | 4 × 16 | 4 × 16 | 4 × 16 |
| | Pitch | 9 mm | 9 mm | 9 mm | 9 mm |
| | Standard thickness | 0.4 mm | 0.4 mm | 0.4 mm | 0.4 mm |
| | Standard outer diameter | 2.26 mm | 2.26 mm | 2.18 mm | 2.28 mm |

TABLE 2

| | | Example 3 | Example 4 | Comparison 3 | Comparison 4 |
|---|---|---|---|---|---|
| Conductor | Material | annealed copper wire | annealed copper wire | annealed copper wire | annealed copper wire |
| | Construction | 0.65 mm each | 0.65 mm each | 0.65 mm each | 0.65 mm each |
| | Standard outer diameter | 0.65 mm | 0.65 mm | 0.65 mm | 0.65 mm |
| Insulator | Material | Hitrel 2751 | Perplen S-9002 | terephthalic polyhydric alcohol varnish | terephthalic polyhydric alcohol varnish |
| | Coating method | extrusion | extrusion | paint baking | paint baking |
| | Standard thickness | 0.040 | 0.040 | 0.020 | 0.045 |
| | Standard outer diameter | 0.73 mm | 0.73 mm | 0.69 mm | 0.74 mm |
| Twisting | Direction | clockwise | clockwise | clockwise | clockwise |
| | Pitch | 22 mm | 22 mm | 22 mm | 22 mm |
| | Standard outer diameter | 1.46 mm | 1.46 mm | 1.38 mm | 1.48 mm |
| Inner | Material | Polyethylene | Polyethylene | Polyethylene | Polyethylene |

TABLE 2-continued

|  |  | Example 3 | Example 4 | Comparison 3 | Comparison 4 |
|---|---|---|---|---|---|
| brading |  | yarn, 200 denier single yarn | yarn, 200 denier single yarn | yarn, 200 denier single yarn | yarn, 200 denier single yarn |
|  | Strings × Reels | 4 × 16 | 4 × 16 | 4 × 16 | 4 × 16 |
|  | Pitch | 9 mm | 9 mm | 9 mm | 9 mm |
|  | Standard thickness | 0.4 mm | 0.4 mm | 0.4 mm | 0.4 mm |
|  | Standard outer diameter | 2.26 mm | 2.26 mm | 2.18 mm | 2.28 mm |
| Outer braiding | Material | Tetron yarn (black), 100 denier double yarn | Tetron yarn (black), 100 denier double yarn | Tetron yarn (black), 100 denier double yarn | Tetron yarn (black), 100 denier double yarn |
|  | Strings × Reels | 6 × 16 | 6 × 16 | 6 × 16 | 6 × 16 |
|  | Pitch | 16 mm | 16 mm | 16 mm | 16 mm |
|  | Standard thickness | 0.4 mm | 0.4 mm | 0.4 mm | 0.4 mm |
|  | Standard outer diameter | 3.06 mm | 3.06 mm | 2.98 mm | 3.08 mm |

TABLE 3

|  |  | Example 5 | Example 6 | Comparison 5 | Comparison 6 |
|---|---|---|---|---|---|
| Conductor | Material | annealed copper wire | annealed copper wire | annealed copper wire | annealed copper wire |
|  | Construction | 0.65 mm each | 0.65 mm each | 0.65 mm each | 0.65 mm each |
|  | Standard outer diameter | 0.65 mm | 0.65 mm | 0.65 mm | 0.65 mm |
| Insulator | Material | Hitrel 2751 | Perplen S-9002 | terephthalic polyhydric alcohol varnish | terephthalic polyhydric alcohol varnish |
|  | Coating method | extrusion | extrusion | paint baking | paint baking |
|  | Standard thickness | 0.040 | 0.040 | 0.045 | 0.045 |
|  | Standard outer diameter | 0.73 mm | 0.73 mm | 0.74 mm | 0.74 mm |
| Twisting | Direction | clockwise | clockwise | clockwise | clockwise |
|  | Pitch | 22 mm | 22 mm | 22 mm | 22 mm |
|  | Standard outer diameter | 1.46 mm | 1.46 mm | 1.48 mm | 1.48 mm |
| Braiding | Material | polyethylene yarn (black), 200 denier single yarn and Tetron yarn (black), 100 denier double yarn | polyethylene yarn (black), 200 denier single yarn and Tetron yarn (black), 100 denier double yarn | polyethylene yarn (black), 200 denier single yarn and Tetron yarn (black), 100 denier double yarn | Tetron yarn 100 denier double yarn |
|  | Strings × Reels Reels | polyethylene 2 × 8 Tetron 2 × 8 | polyethylene 2 × 8 Tetron 2 × 8 | polyethylene 2 × 8 Tetron 2 × 8 | 4 × 16 |
|  | Pitch | 9 mm | 9 mm | 9 mm | 9 mm |
|  | Standard thickness | 0.4 mm | 0.4 mm | 0.4 mm | 0.4 mm |
|  | Standard outer diameter | 2.26 mm | 2.26 mm | 2.28 mm | 2.28 mm |

TABLE 4

|  |  | Example 7 | Example 8 | Comparison 7 | Comparison 8 |
|---|---|---|---|---|---|
| Conductor | Material | annealed copper wire | annealed copper wire | annealed copper wire | annealed copper wire |
|  | Construction | 0.65 mm each | 0.65 mm each | 0.65 mm each | 0.65 mm each |
|  | Standard outer diameter | 0.65 mm | 0.65 mm | 0.65 mm | 0.65 mm |
| Insulator | Material | Hitrel 2751 | Perplen S-9002 | terephthalic polyhydric alcohol varnish | terephthalic polyhydric alcohol varnish |
|  | Coating method | extrusion | extrusion | paint baking | paint baking |
|  | Standard thickness | 0.040 | 0.040 | 0.045 | 0.045 |
|  | Standard outer diameter | 0.73 mm | 0.73 mm | 0.74 mm | 0.74 mm |
| Twisting | Direction | clockwise | clockwise | clockwise | clockwise |
|  | Pitch | 22 mm | 22 mm | 22 mm | 22 mm |
|  | Standard outer diameter | 1.46 mm | 1.46 mm | 1.48 mm | 1.48 mm |
| Inner brading | Material | polyethylene yarn (white), 200 denier single yarn and Tetron yarn (black), 100 denier double yarn | polyethylene yarn (white), 200 denier single yarn and Tetron yarn (black), 100 denier double yarn | polyethylene yarn (white), 200 denier single yarn and Tetron yarn (black), 100 denier double yarn | Polyethylene yarn, 200 denier single yarn |
|  | Strings × Reels | polyethylene 2 × 8, Tetron 2 × 8 | polyethylene 2 × 8, Tetron 2 × 8 | polyethylene 2 × 8, Tetron 2 × 8 | polyethylene yarn 4 × 16 |
|  | Pitch | 9 mm | 9 mm | 9 mm | 9 mm |
|  | Standard thickness | 0.4 mm | 0.4 mm | 0.4 mm | 0.4 mm |
|  | Standard outer diameter | 2.26 mm | 2.26 mm | 2.28 mm | 2.28 mm |
| Outer braiding | Material | Tetron yarn (black), 100 denier double yarn | Tetron yarn (black), 100 denier double yarn | Tetron yarn (black), 100 denier double yarn | Tetron yarn (black), 100 denier double yarn |

TABLE 4-continued

|  | | Example 7 | Example 8 | Comparison 7 | Comparison 8 |
| --- | --- | --- | --- | --- | --- |
|  | Strings × Reels | 6 × 16 | 6 × 16 | 4 × 24 | 4 × 24 |
|  | Pitch | 16 mm | 16 mm | 16 mm | 16 mm |
|  | Standard thickness | 0.4 mm | 0.4 mm | 0.4 mm | 0.4 mm |
|  | Standard outer diameter | 3.06 mm | 3.06 mm | 3.08 mm | 3.08 mm |

TABLE 5

|  |  | Example 9 | Example 10 | Comparison 9 | Comparison 10 |
| --- | --- | --- | --- | --- | --- |
| Conductor | Material | annealed copper wire | annealed copper wire | annealed copper wire | annealed copper wire |
|  | Construction | 0.65 mm each | 0.65 mm each | 0.65 mm each | 0.65 mm each |
|  | Standard outer diameter | 0.65 mm | 0.65 mm | 0.65 mm | 0.65 mm |
| Insulator | Material | Hitrel | Perplen | terephthalic polyhydric alcohol varnish | terephthalic polyhydric alcohol varnish |
|  | Coating method | extrusion | extrusion | paint baking | paint baking |
|  | Standard thickness | 0.040 | 0.040 | 0.020 | 0.045 |
|  | Standard outer diameter | 0.73 mm | 0.73 mm | 0.69 mm | 0.74 mm |
| Twisting | Direction | clockwise | clockwise | clockwise | clockwise |
|  | Pitch | 22 mm | 22 mm | 22 mm | 22 mm |
|  | Inclusion |  |  |  |  |
|  | Center | 0.3 mmφ | 0.3 mmφ | Tetron yarn 0.28 mmφ | Tetron yarn 0.3 mmφ |
|  | Outer layer | 100 denier double yarn | 100 denier double yarn | Tetron yarn 0.69 mmφ | Tetron yarn 0.74 mmφ |
|  | Standard outer diameter | 1.78 mm | 1.78 mm | 1.70 mm | 1.80 mm |
| Braiding | Material | polyethylene yarn (black), 200 denier single yarn and Tetron yarn (black), 100 denier double yarn | polyethylene yarn (black), 200 denier single yarn and Tetron yarn (black), 100 denier double yarn | polyethylene yarn (black), 200 denier single yarn and Tetron yarn (black), 100 denier double yarn | polyethylene yarn (black), 200 denier single yarn and Tetron yarn (black), 100 denier double yarn |
|  | Strings × Reels | polyethylene 3 × 8 Tetron 3 × 8 | polyethylene 3 × 8 Tetron 3 × 8 | polyethylene 2 × 8 Tetron 2 × 8 | polyethylene 3 × 8 Tetron 3 × 8 |
|  | Pitch | 11 mm | 11 mm | 9 mm | 11 mm |
|  | Standard thickness | 0.4 mm | 0.4 mm | 0.4 mm | 0.4 mm |
|  | Standard outer diameter | 2.58 mm | 2.58 mm | 2.50 mm | 2.60 mm |

TABLE 6

|  |  | Example 11 | Example 12 | Comparison 11 | Comparison 12 |
| --- | --- | --- | --- | --- | --- |
| Conductor | Material | annealed copper wire | annealed copper wire | annealed copper wire | annealed copper wire |
|  | Construction | 0.65 mm each | 0.65 mm each | 0.65 mm each | 0.65 mm each |
|  | Standard outer diameter | 0.65 mm | 0.65 mm | 0.65 mm | 0.65 mm |
| Insulator | Material | Hitrel | Perplen | terephthalic polyhydric alcohol varnish | terephthalic polyhydric alcohol varnish |
|  | Coating method | extrusion | extrusion | paint baking | paint baking |
|  | Standard thickness | 0.040 | 0.040 | 0.020 | 0.045 |
|  | Standard outer diameter | 0.73 mm | 0.73 mm | 0.69 mm | 0.74 mm |
| Twisting | Direction | clockwise | clockwise | clockwise | clockwise |
|  | Pitch | 22 mm | 22 mm | 22 mm | 22 mm |
|  | Inclusion |  |  |  |  |
|  | Center | 0.3 mmφ | 0.3 mmφ | Tetron 0.28 mmφ | Tetron 0.3 mmφ |
|  | Outer layer | 100 denier double yarn | 100 denier double yarn | Tetron yarn 0.69 mmφ | Tetron yarn 0.74 mmφ |
|  | Standard outer diameter | 1.78 mm | 1.78 mm | 1.70 mm | 1.80 mm |
| Inner brading | Material | polyethylene yarn (white), 200 denier single yarn and Tetron yarn (black), 100 denier double yarn | polyethylene yarn (white), 200 denier single yarn and Tetron yarn (black), 100 denier double yarn | polyethylene yarn (white), 200 denier single yarn and Tetron yarn (black), 100 denier double yarn | polyethylene yarn (white), 200 denier single yarn and Tetron yarn (black), 100 denier double yarn |
|  | Strings × Reels | polyethylene 3 × 8, Tetron 3 × 8 | polyethylene 3 × 8, Tetron 3 × 8 | polyethylene 2 × 8, Tetron 2 × 8 | polyethylene 3 × 8, Tetron 3 × 8 |
|  | Pitch | 11 mm | 11 mm | 9 mm | 11 mm |
|  | Standard thickness | 0.4 mm | 0.4 mm | 0.4 mm | 0.4 mm |
|  | Standard outer diameter | 2.58 mm | 2.58 mm | 2.50 mm | 2.60 mm |
| Outer braiding | Material | Tetron yarn (black), 100 denier double yarn | Tetron yarn (black), 100 denier double yarn | Tetron yarn (black), 100 denier double yarn | Tetron yarn (black), 100 denier double yarn |
|  | Strings × Reels | 7 × 16 | 7 × 16 | 6 × 16 | 7 × 16 |

TABLE 6-continued

|  | Example 11 | Example 12 | Comparison 11 | Comparison 12 |
| --- | --- | --- | --- | --- |
| Pitch | 14 mm | 14 mm | 16 mm | 14 mm |
| Standard thickness | 0.4 mm | 0.4 mm | 0.4 mm | 0.4 mm |
| Standard outer diameter | 3.38 mm | 3.38 mm | 3.30 mm | 3.40 mm |

Figure 9:
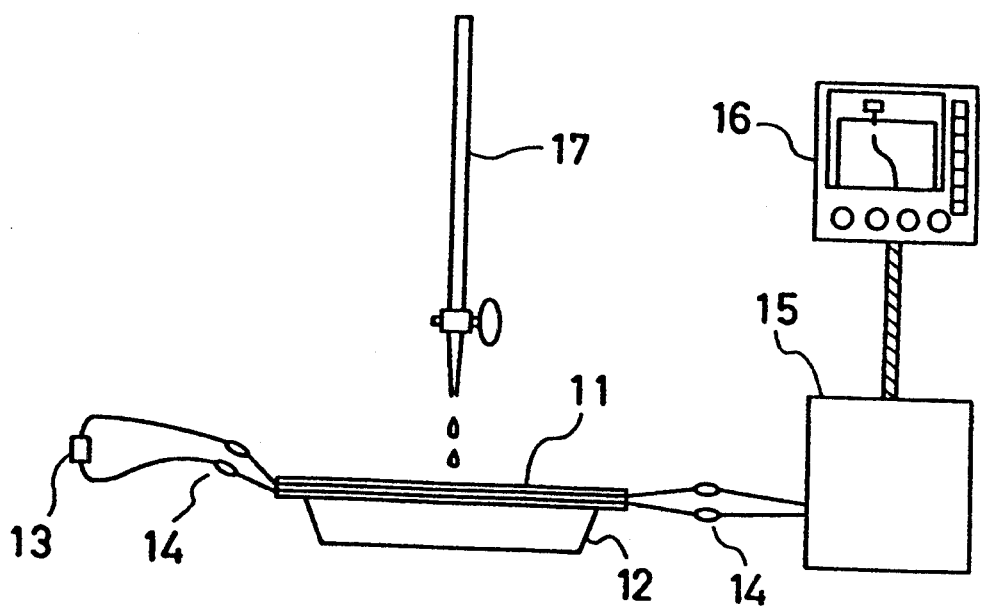
FIG. 9 is a view of a checking device for a liquid leakage detector line.

The measurements were made according to the following method. First, as shown in FIG. 9, a test sample 10 11 of a detector line of approximately 1 m length was placed on a pad 12, and the conductors of the wiry electrodes were exposed at both ends of the test sample 11. A 5Ω resistor 13 was attached to one end thereof with a clip 14, and a liquid leakage detector 15 equipped with a recorder 16 was attached to the other end with a clip 14. The liquid leakage detector 15 detects the occurrence of abnormal current by, for example, converting the alternating voltage applied by an alternating current source through the resisters between the wiry electrodes, and divided by the resistance of the above mentioned resisters and the insulation resistance between the wiry electrodes of the detector line, into direct current via a rectifying circuit, and comparing the converted value with the standard voltage values using a comparator, etc. The recorder 16 records the variations in the above mentioned direct current. Also, the detection test sample 11 was placed in a thermostatic chamber capable of being set to a specific temperature, a burette 17 was set above it at the center thereof, and a solution of 98% sulfuric acid was added dropwise thereto at a rate of 0.02 ml/sec, to measure the time (minutes) required for the insulation resistance between the wiry electrodes to reach 5 k Ω or lower.

The measurement results are shown in Tables 7–12 and in FIGS. 10–15.

TABLE 7

|  | 10° C. Average | 25° C. Average | 50° C. Average |
| --- | --- | --- | --- |
| Example 1 (Hitrel 2751, thickness: 40 μm) | 3 min 37 sec | 1 min 42 sec | 52 sec |
| Example 2 (Perplen S-9002, thickness: 40 μm) | 5 min 10 sec | 2 min 55 sec | 1 min 18 sec |
| Comparison 1 (terephtalic polyhydric alcohol varnish, thickness: 20 μm) | 11 min 24 sec | 4 min 10 sec | 1 min 48 sec |
| Comparison 2 (terephthalic polyhydric alcohol varnish, thickness: 45 μm) | 17 min 47 sec | 5 min 46 sec | 1 min 54 sec |

TABLE 8

|  | 10° C. Average | 25° C. Average | 50° C. Average |
| --- | --- | --- | --- |
| Example 3 (Hitrel 2751, thickness: 40 μm) | 3 min 54 sec | 2 min 07 sec | 1 min 11 sec |
| Example 4 (Perplen S-9002, thickness: 40 μm) | 5 min 26 sec | 3 min 41 sec | 1 min 52 sec |
| Comparison 3 (terephtalic polyhydric alcohol varnish, thickness: 20 μm) | 12 min 54 sec | 4 min 23 sec | 2 min 13 sec |
| Comparison 4 (terephthalic polyhydric alcohol varnish, thickness: 45 μm) | 18 min 15 sec | 6 min 18 sec | 2 min 56 sec |

TABLE 9

|  | 10° C. | | 25° C. | | 50° C. | |
| --- | --- | --- | --- | --- | --- | --- |
|  | Average | Standard deviation | Average | Standard deviation | Average | Standard deviation |
| Example 5 (Hitrel) | 3 min 13 sec | 24.4 sec | 1 min 24 sec | 5.38 sec | 31.0 sec | 1.7 sec |
| Example 6 (Perplen) | 5 min 05 sec | 35.8 sec | 2 min 35 sec | 23.7 sec | 54.1 sec | 2.8 sec |
| Comparison 5 (enamel) | 15 min 16 sec | 54.5 sec | 5 min 16 sec | 25.2 sec | 1 min 53 sec | 17.4 sec |
| Comparison 6 (enamel) | 17 min 47 sec | 2 min 35 sec | 5 min 46 sec | 48.1 sec | 1 min 54 sec | 27.2 sec |

Number of samples: 10 for each temperature

TABLE 10

|  | 10° C. | | 25° C. | | 50° C. | |
| --- | --- | --- | --- | --- | --- | --- |
|  | Average | Standard deviation | Average | Standard deviation | Average | Standard deviation |
| Example 7 (Hitrel) | 3 min 18 sec | 30.5 sec | 1 min 34 sec | 12.2 sec | 37.6 sec | 1.4 sec |
| Example 8 (Perplen) | 5 min 57 sec | 27.4 sec | 2 min 51 sec | 17.2 sec | 1 min 06 sec | 2.9 sec |
| Comparison 7 (enamel) | 17 min 22 sec | 49.7 sec | 5 min 50 sec | 24.0 sec | 2 min 07 sec | 5.6 sec |
| Comparison 8 | 18 min 15 sec | 1 min 48 sec | 6 min 18 sec | 56.4 sec | 2 min 56 sec | 17.5 sec |

TABLE 10-continued

| | 10° C. | | 25° C. | | 50° C. | |
|---|---|---|---|---|---|---|
| | Average | Standard deviation | Average | Standard deviation | Average | Standard deviation |
| (enamel) | | | | | | |

Number of samples: 10 for each temperature

TABLE 11

| | 10° C. Average | 25° C. Average | 50° C. Average |
|---|---|---|---|
| Example 9 (Hitrel 2751, thickness: 40 μm) | 3 min 47 sec | 2 min 01 sec | 45.4 sec |
| Example 10 (Perplen S-9002, thickness: 40 μm) | 4 min 57 sec | 3 min 15 sec | 1 min 07 sec |
| Comparison 9 (enamel, thickness: 20 μm) | 11 min 24 sec | 3 min 42 sec | 1 min 54 sec |
| Comparison 10 (enamel, thickness: 45 μm) | 16 min 51 sec | 6 min 35 sec | 2 min 23 sec |

Number of samples: 10 for each temperature

TABLE 12

| | 10° C. Average | 25° C. Average | 50° C. Average |
|---|---|---|---|
| Example 11 (Hitrel 2751, thickness: 40 μm) | 4 min 25 sec | 2 min 06 sec | 51.4 sec |
| Example 12 (Perplen S-9002, thickness: 40 μm) | 6 min 52 sec | 3 min 50 sec | 1 min 21 sec |
| Comparison 11 (enamel, thickness: 20 μm) | 12 min 01 sec | 4 min 35 sec | 2 min 07 sec |
| Comparison 12 (enamel, thickness: 45 μm) | 19 min 16 sec | 7 min 40 sec | 2 min 50 sec |

Number of samples: 10 for each temperature

In Examples 1 and 2 according to the present invention and Comparisons 1 and 2, the coating layer 4 in FIG. 1 is a single braided body layer consisting of black multi-filament Tetron yarn, and the concrete construction thereof is listed in Table 1. By "4 string" is meant that yarn rolled off of one reel is a bundle of 4 strings, and by "16 reel" is meant that braiding was done using a total of 16 reels positioned in an alternating fashion, 8 for winding counter-clockwise and 8 for winding clockwise (same hereunder).

Examples 3 and 4 according to the present invention and Comparisons 3 and 4 comprise an inner braided body layer 5 and an outer braided body layer 6, as shown in FIG. 2. The inner braided body layer 5 is made of mono-filament polyethylene yarn, while the outer braided body layer 6 is made of black multi-filament Tetron yarn. Concrete constructions thereof are given in Table 2.

Particularly, the differences between Examples 1, 2, 3 and 4 according to the present invention and Comparisons 1, 2, 3 and 4 are as follows. In Examples 1 and 3, the material used as the insulator was an extrusion coating of Hitrel of a thickness of 40 μm, while in Examples 2 and 4, the material used as the insulator was that of Perplen-S of a thickness of 40 μm. On the other hand, in Comparisons 1 and 3, the material used was a terephthalic polyhydric alcohol varnish applied to a thickness of 20 μm and baked (so-called enamel coating), while in Comparisons 2 and 4, the enamel coating was formed to a thickness of 45 μm.

Figure 10:
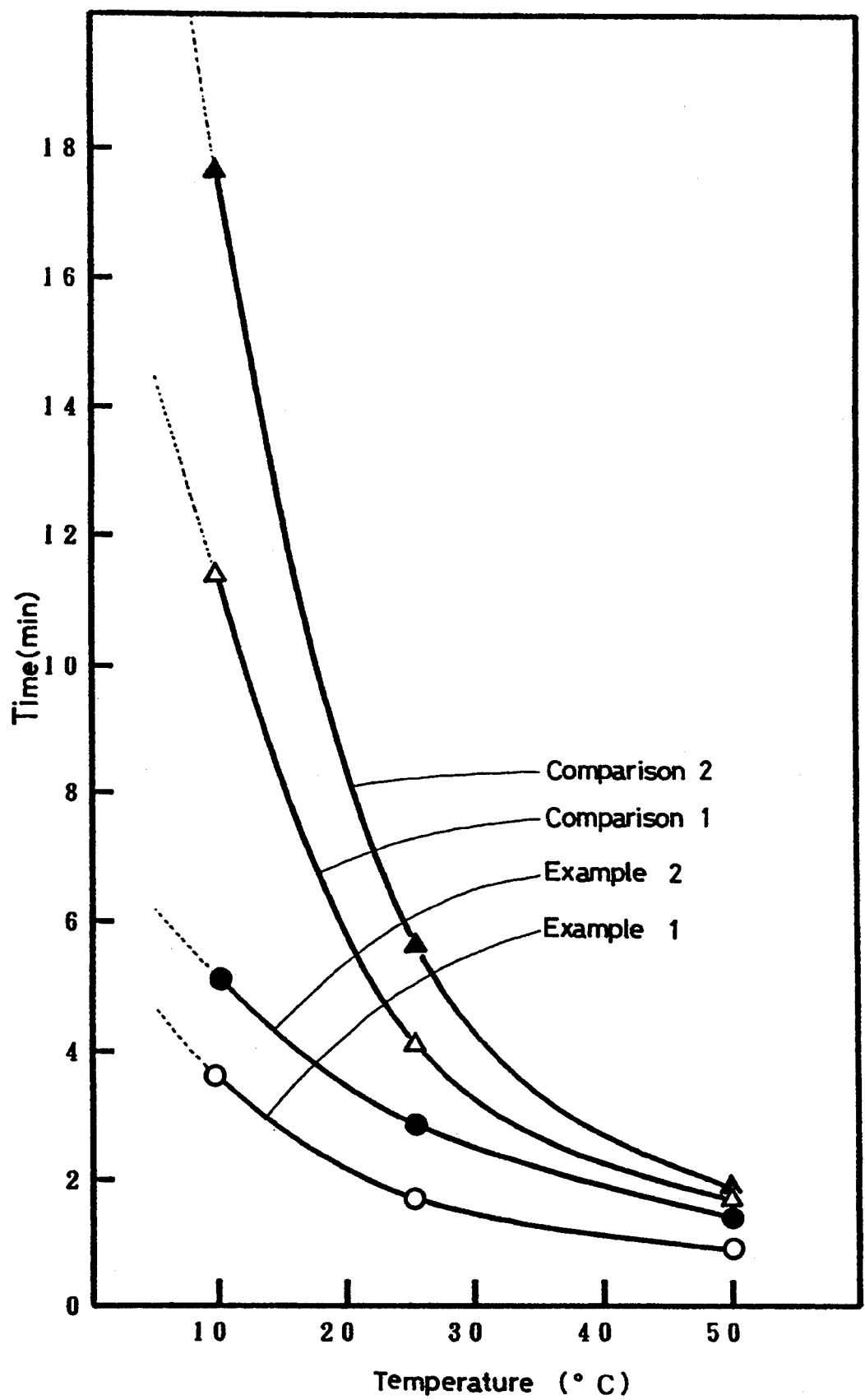
FIGS. 10-15 are graphs showing the temperature dependence of detection times by liquid leakage detector lines.
Figure 11:
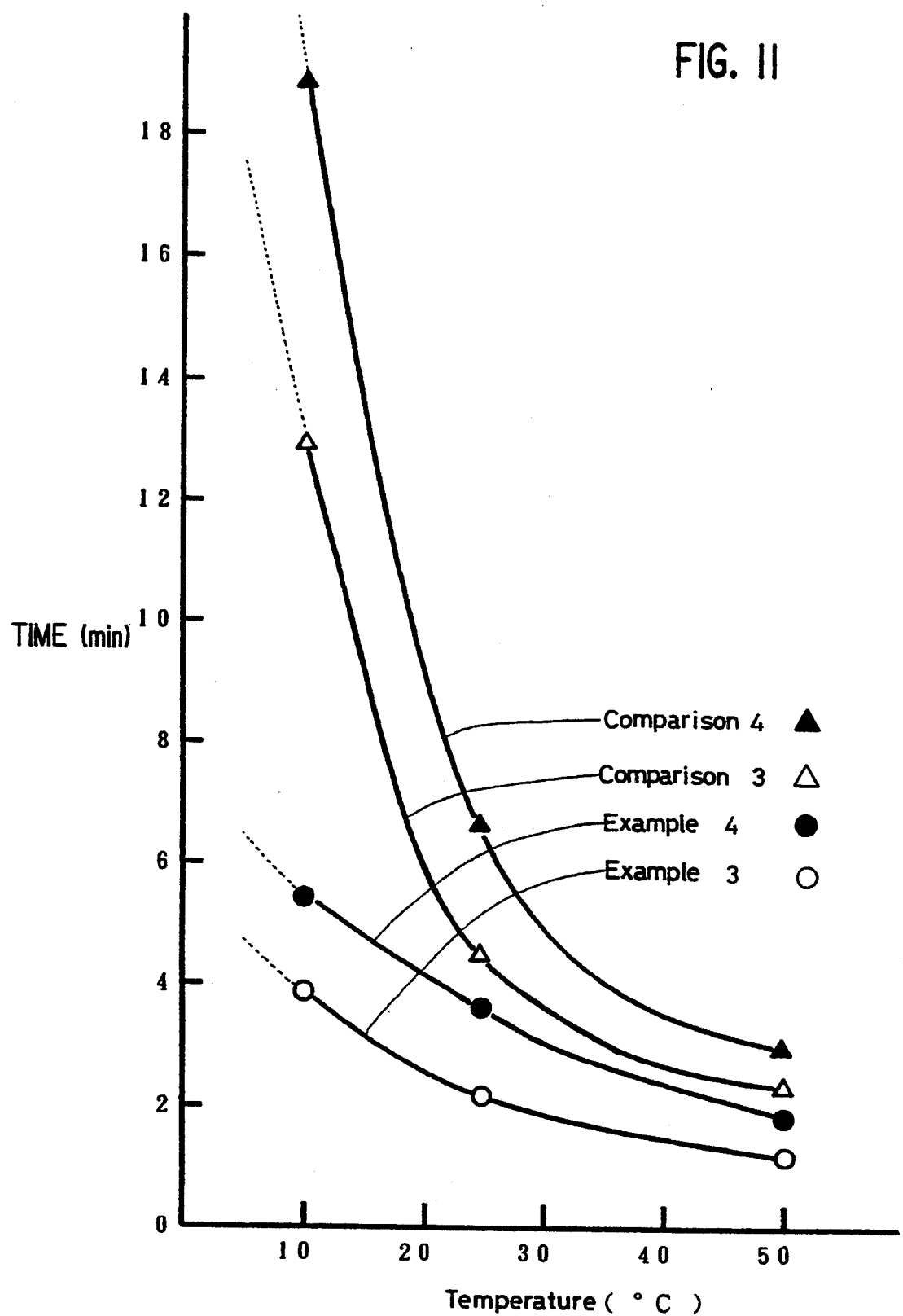

As is clear from FIGS. 10 and 11, the Examples of the present invention not only had a shorter detection time over the entire temperature range than the Comparisons, but the Comparisons also showed a tendency towards a particularly sharp increase in the detection time in the low temperature range of 15° C. or lower, while the Examples did not show such an increase in the detection time, even in the low temperature range.

Further, Examples 1-4 which employ a polyester elastomer of thickness 40 μm as the insulator had a shorter detection time and better sensitivity compared to Comparisons 1 and 3.

The coating layer 4 in FIG. 1 according to Examples 5 and 6 of the present invention and Comparisons 5 and 6 comprises a braided body layer which, as shown in FIG. 7, is made of an alternating pattern of groups consisting of mono-filament polyethylene yarn 4a which is non-liquid-soluble, waterproof and non-absorbent, and groups consisting of multi-filament Tetron yarn 4b which is liquid-soluble, waterproof and liquid-absorbent. Concrete constructions thereof are given in Table 3. Table 3 shows a coating layer 4 with a total of 16 reels: an alternating pattern of counter-clockwise and clockwise wound yarns which are 2-string, 8-reel mono-filament polyethylene yarn 4a (black) and 2-string, 8-reel multi-filament Tetron yarn 4b (black), respectively.

The inner layer 5 in FIG. 2 according to Examples 7 and 8 of the present invention and Comparisons 7 and 8 comprises a braided body layer made of an alternating pattern of groups consisting of mono-filament yarn 5a consisting in turn of polyethylene, polypropylene or another fiber which is non-liquid-soluble and non-absorbent, and groups consisting of multi-filament yarn 5b consisting in turn of Tetron or another fiber which is liquid-soluble and liquid-absorbent. The outer layer 6 comprises a braided body layer 6 made of a black, multi-filament yarn consisting of Tetron or another polyester fiber which is liquid soluble, liquid-absorbent and weather resistant. Concrete constructions thereof are given in Table 4.

The differences between Examples 5-8 according to the present invention and Comparisons 5-8 are as follows. In addition to using a different material for the insulator 2, the Examples employ a braided body layer with an alternating pattern of groups of mono-filament polyethylene yarn 4a which is non-liquid-soluble and non-absorbent, and groups of multi-filament Tetron yarn 4b which is liquid-soluble and liquid-absorbent, while the Comparisons are constructed with the single composition braided body layer made of one type of yarn.

Figure 12:
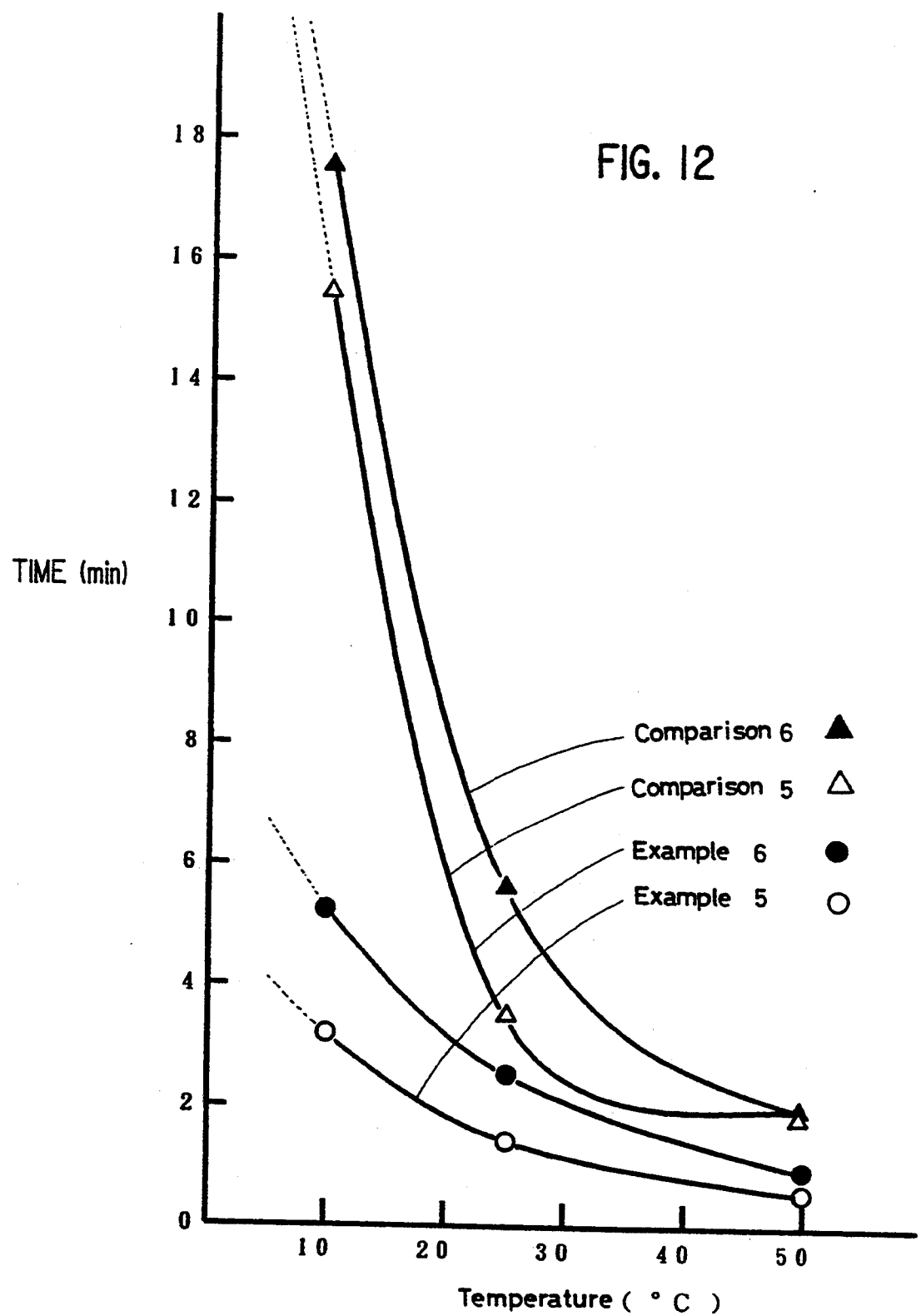
Figure 13:
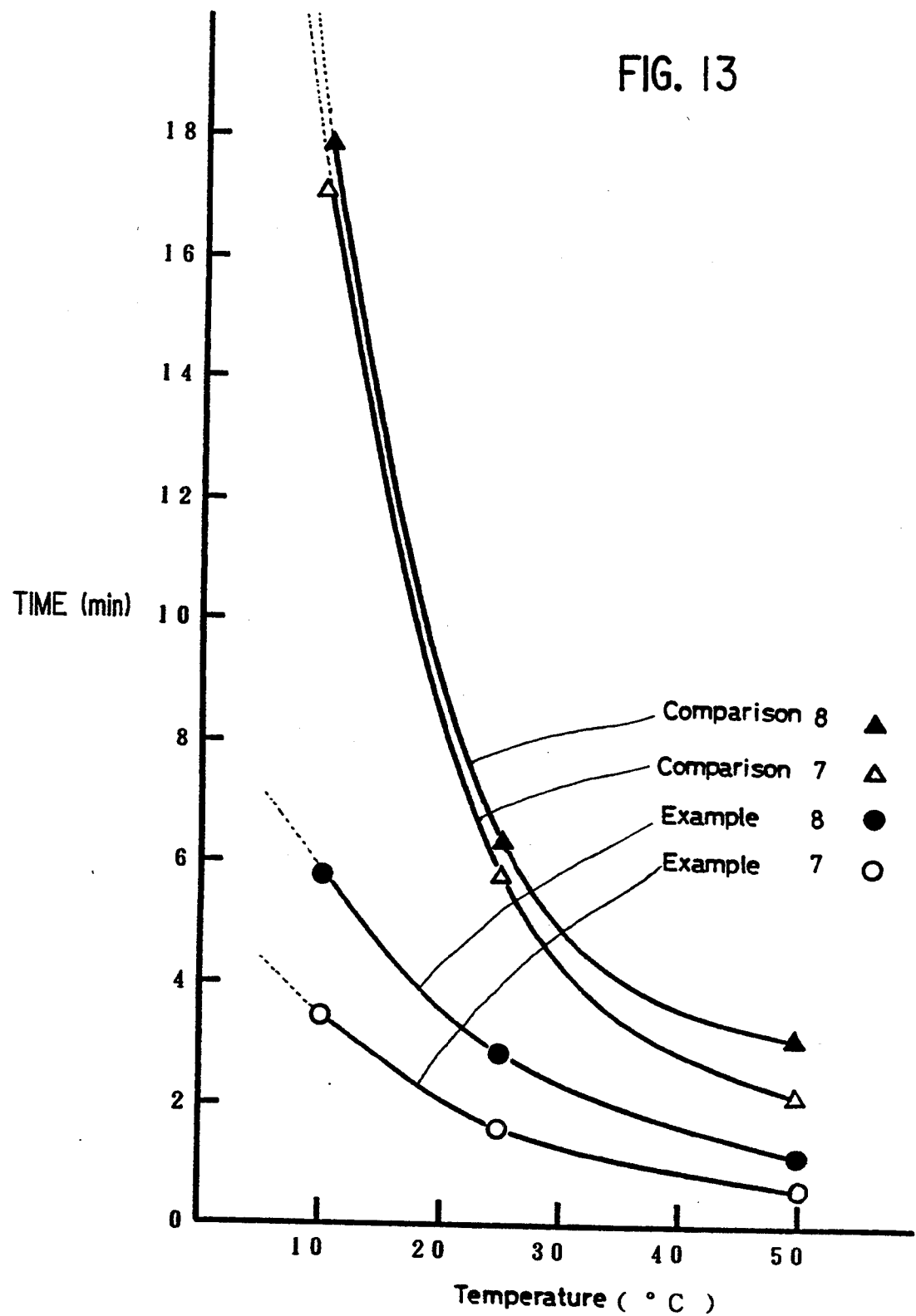

As is clear from Tables 9, 10 and FIGS. 12, 13, the Examples have a shorter detection time than the Comparisons, over the entire temperature range, and there is practically no increase in the detection time at temperatures of 15° C. or lower. Also, as Tables 9 and 10 make clear, when the standard deviation (variance) was calculated using 10 samples from each detector line, there was less variation in the detection time for the Examples than for the Comparisons. Therefore, this alone proves the high reliability of the present invention as a detector line.

Examples 9-12 according to the present invention and Comparisons 9-12 are each detector lines provided with a spacer 7. The spacer 7 may be, as shown in FIGS. 3 and 5, a cord made of a member which is waterproof and dissolves in the liquid to be detected, for example, a polyester cord 7a.

Examples 9 and 10 according to the present invention and Comparisons 9 and 10 possess, as shown in FIG. 3, a coating layer 4 which consists of a single layer, while Examples 11 and 12 according to the present invention and Comparisons 11 and 12 possess, as shown in FIG. 5, a double layer consisting of an inner layer 5 and an outer layer 6. Concrete constructions thereof are given in Tables 5 and 6, respectively.

The differences between Examples 9-12 according to the present invention and Comparisons 9-12 are as follows. In addition to using a different material for the insulator 2, the spacers 7a or inclusions 8 have slightly different diameters.

Figure 14:
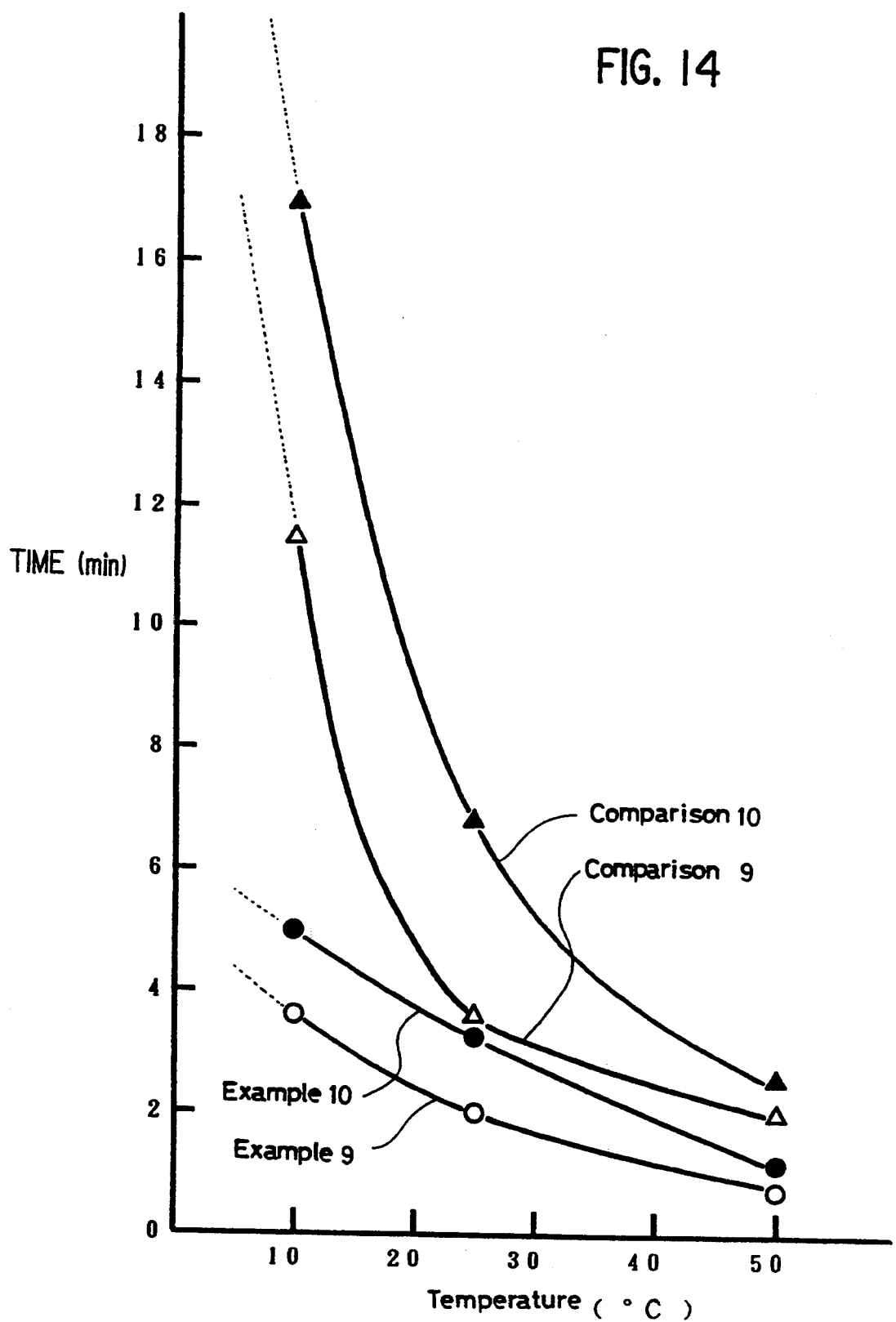
Figure 15:
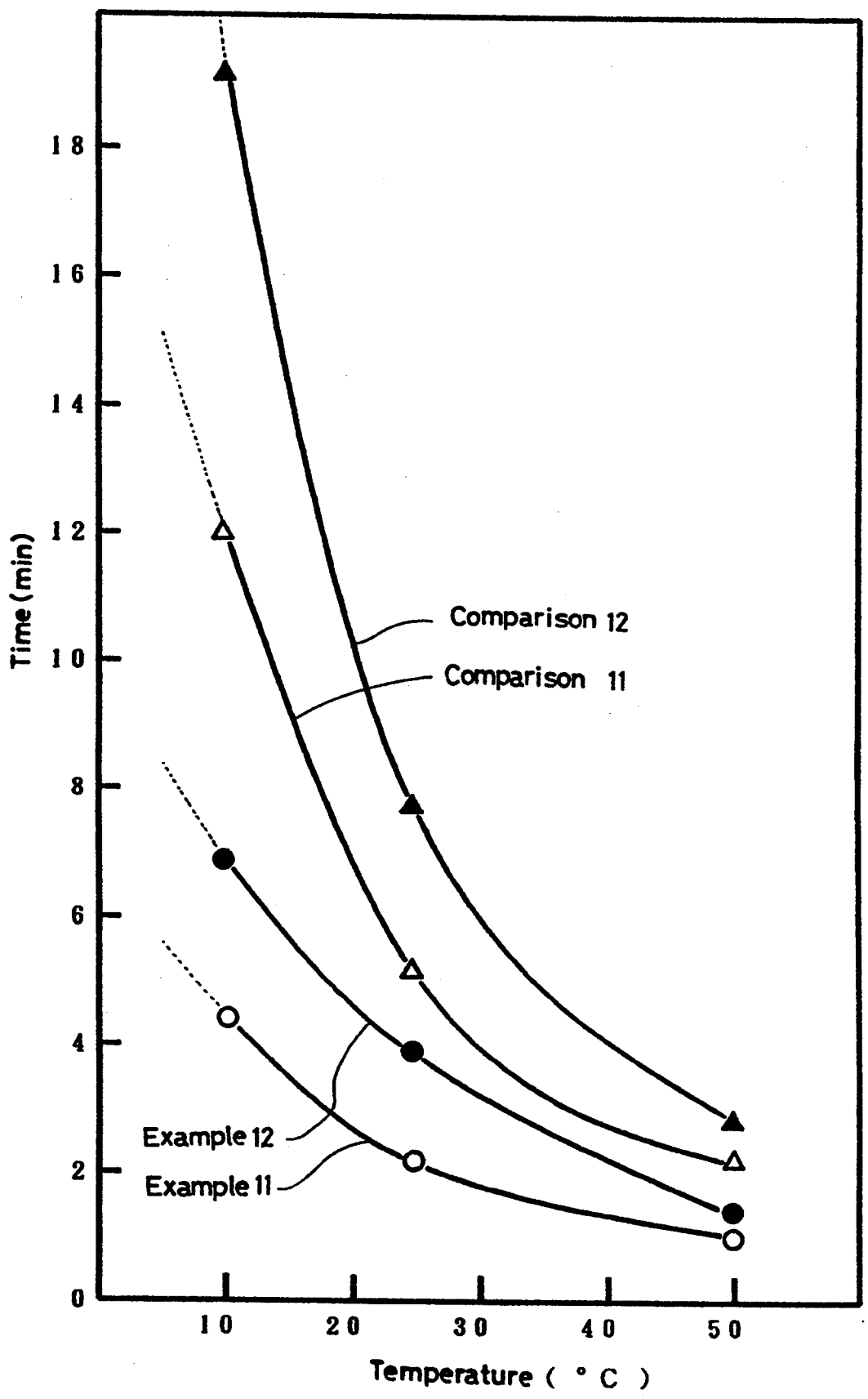

As is clear from Tables 11, 12 and FIGS. 14, 15, the results of measurement showed that the Examples had a shorter detection time than the Comparisons over the entire temperature range, and there was practically no increase in the detection time even at low temperatures of 15° C. lower. In addition, as mentioned previously, Examples 9-12 maintain a minute gap between the wiry electrodes 3, and thus even if damage or pinholes occur in the insulator 2 of the wiry electrodes 3, there is no fear of erroneous actuation, due to an extremely low probability of the electrical resistance value of the wiry electrodes 3 falling below the standard value. With a gap between the wiry electrodes, a lengthening in the detection time might be feared, but as shown from the results of measurement given above, there was no significant difference when compared to the other Examples 1-8.

In place of the spacer 7a made of small-diameter polyester cord, a spacer 7b consisting of tape which is waterproof and soluble in the liquid to be detected may be wrapped around the wiry electrodes 3, as shown in FIGS. 4 and 6. Such a tape may be, for example, a polyester tape. The minute gap between the pair of wiry electrodes 3, 3 may thus be easily adjusted by changing the thickness of the tape itself and the density of the wrapping. Also, since it is only necessary to maintain the minute gap between the pair of wiry electrodes 3, 3 the tape need only be affixed to one of the wiry electrodes 3.

Figure 16:
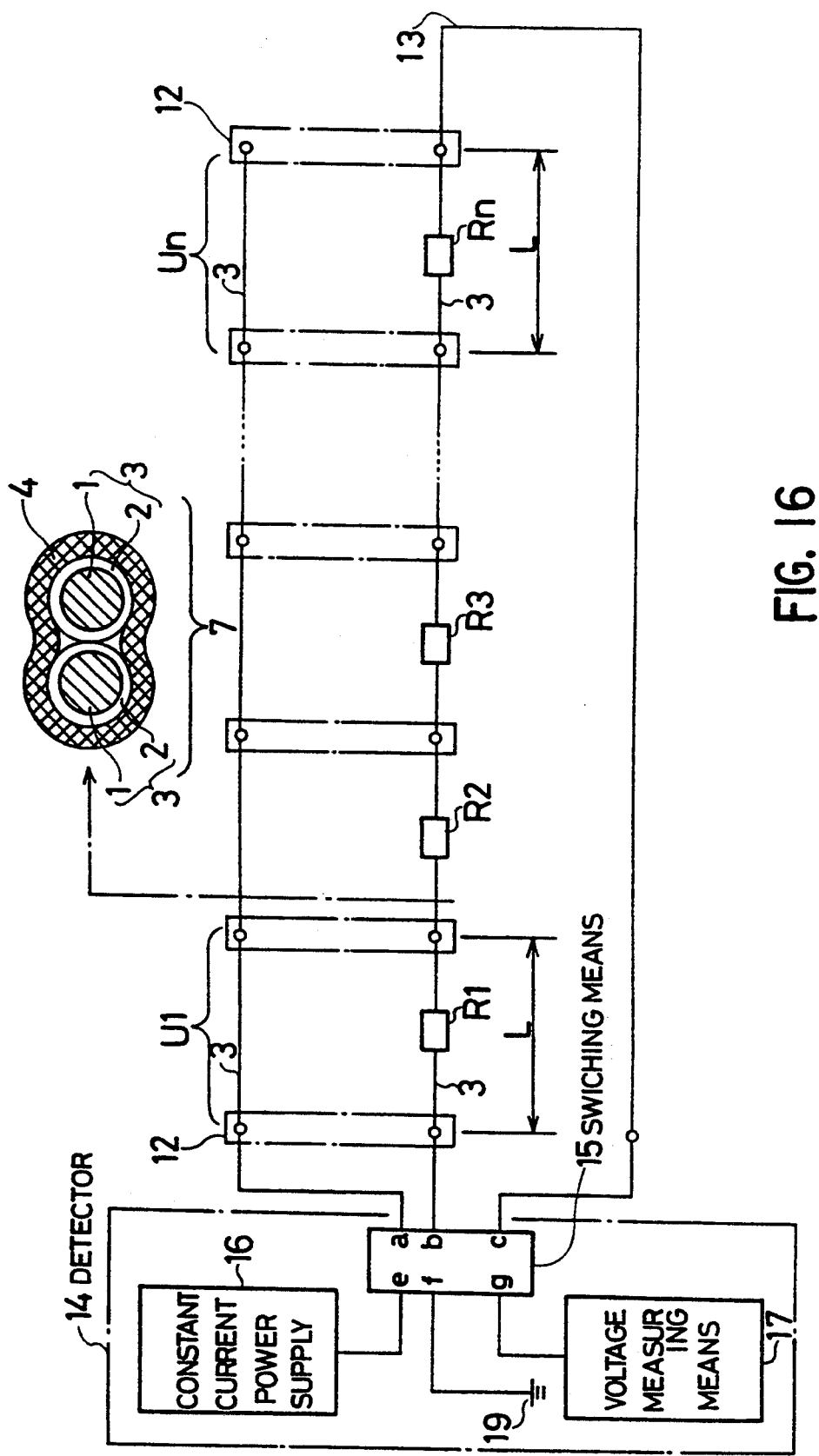
FIG. 16 is an illustration of a liquid leakage detector line according to the present invention which can readily detect the location of liquid leakage.

FIG. 16 is an illustration of a further Example according to the present invention.

In FIG. 16, U (U1 . . . Un) represent unit detector lines, R (R1, R2, R3 . . . Rn) represent resistors, 3, 3 represent a pair of wiry electrodes, 12 represents a connector, and 13 represents a connecting line.

In FIG. 16, the liquid leakage detector line is provided with a specific number n of unit detector lines U (U1 . . . Un) of specified length 1, connected to a connector 12, and a connecting line 13 connected, as necessary, to one end of an wiry electrode 3 to which are connected resistors R (described below). 14 represents a detector, constructed in such a manner that a constant current power supply 16, voltage measuring means 17 and an earth 19 are each connected to switching means 15 possessing contacts a-c and e-g.

The unit detector lines U may be any of those used in the previously mentioned Examples according to the present invention, and as a rule the conductor thereof is a flexible conductor such as annealed copper wire, with a coating layer 4 constructed thereon around the periphery of the core 9 which comprises a pair of wiry electrodes 3 coated with an insulator, arranged parallel to each other or twisted around each other. Also, resistors R ($R_1$-$R_n$) having specified resistance values are connected in series to one end of the wiry electrodes 3 of each unit detector line U ($U_1$-$U_n$).

The components of the core 9 are not limited to the pair of wiry electrodes 3, as the core 9 may also include an inclusion or a connecting line as described below. Also, the connecting line 13 connected to the far-end of the wiry electrode 3 to which are connected resistors R, is a flexible conductor such as annealed copper wire, etc., coated with an insulator which is waterproof and insoluble in the liquid to be detected, for example, polyethylene or polypropylene. This connecting wire 13 may also form the core together with the wiry electrodes 3, and may be coated with the same braided body layer 4, or it may have a construction similar to that of conventional single-core wire, installing it along the braided body layer 4 which coats the wiry electrodes 3 or wiring it by a different route than the wiry electrodes 3.

Figures 17A, 17B:
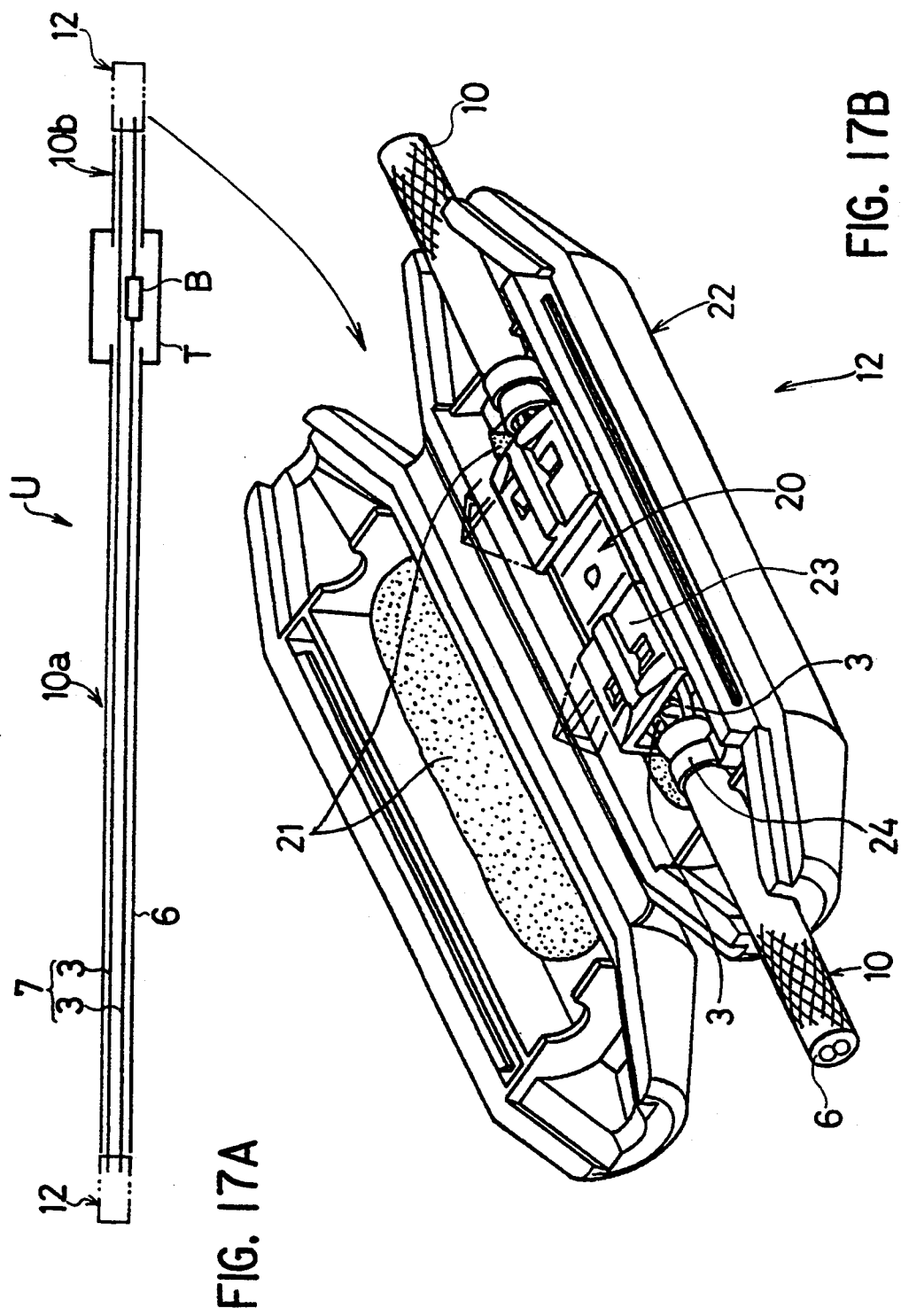
FIG. 17 is a construction drawing of a unit detector line constructed in a liquid leakage detector line, and a connection thereof.

A concrete explanation will now be given regarding the construction of unit detector lines U with no connecting line 13 in the core, with reference to FIG. 17. An element connector box T is positioned midway between the detector lines 10a, 10b which is composed of the core 9 comprising a pair of wiry electrodes 3 coated with a braided body layer 4.

For example, if the entire length of the unit detector lines U is 10 m, then it is separated into a sensing line 10a of 9 m and a sensing line 10b of 1 m. The element connector box T is miniaturized as much as possible, and contains resistors R, in such a manner that the desired unit detector line U may be obtained by simply connecting the ends of the wire bodies 10a, 10b to the element connector box T.

A plurality of such unit detector lines U are installed along the pipeline in connection to the connectors 12. That is, the connection of the unit detector lines U is an on-site operation. Here, connectors should be used which do not require heat or special equipment, may be connected in a short space of time, and may be used outdoors. A connector 12 which meets these requirements is shown in the drawing.

The connector body 20 is made so that it may be stored inside a cover 22 with a waterproof compound 21 filled therein. The connector body 20 possesses flippable caps 23 on both ends, as in a two-dot chain line, and the nails of each cap 23 catch on the base to fix it shut as shown by the solid line. Further, a pair of sharp edges which bite into the insulator of the wiry electrode are arranged parallel inside each cap 23, and the sharp edges between each cap are connected to allow continuity.

An explanation will now be given regarding the method of connection using a connector 12 of this type. The braided body layer 4 at the tip of the sensor 10 is removed and the tip is tied with a band 24 to expose a specified length of the wiry electrodes 3, 3. These wiry electrodes 3, 3 are then inserted at a specified location on the base of the connector body 20. Also, the caps 23 are placed between the wiry electrodes being fixed thereto, to reach the condition shown by the solid line instead of the two-dot chain line. The sharp edges inside the caps 23 bite into the conductors of the wiry electrodes 3, 3, and the wiry electrodes 3, 3 of the left and right detector lines 10a, 10b are connected to each other. Further, a waterproof compound 21 is placed in the a cover 22 which may be opened or closed freely and the cover 22 is closed in such a manner that the connector body 20 is completely surrounded by the waterproof compound 21. This connecting process can be completed in about 5 minutes, with no need of heating or special equipment, and it may be easily performed by anyone.

Figure 18:
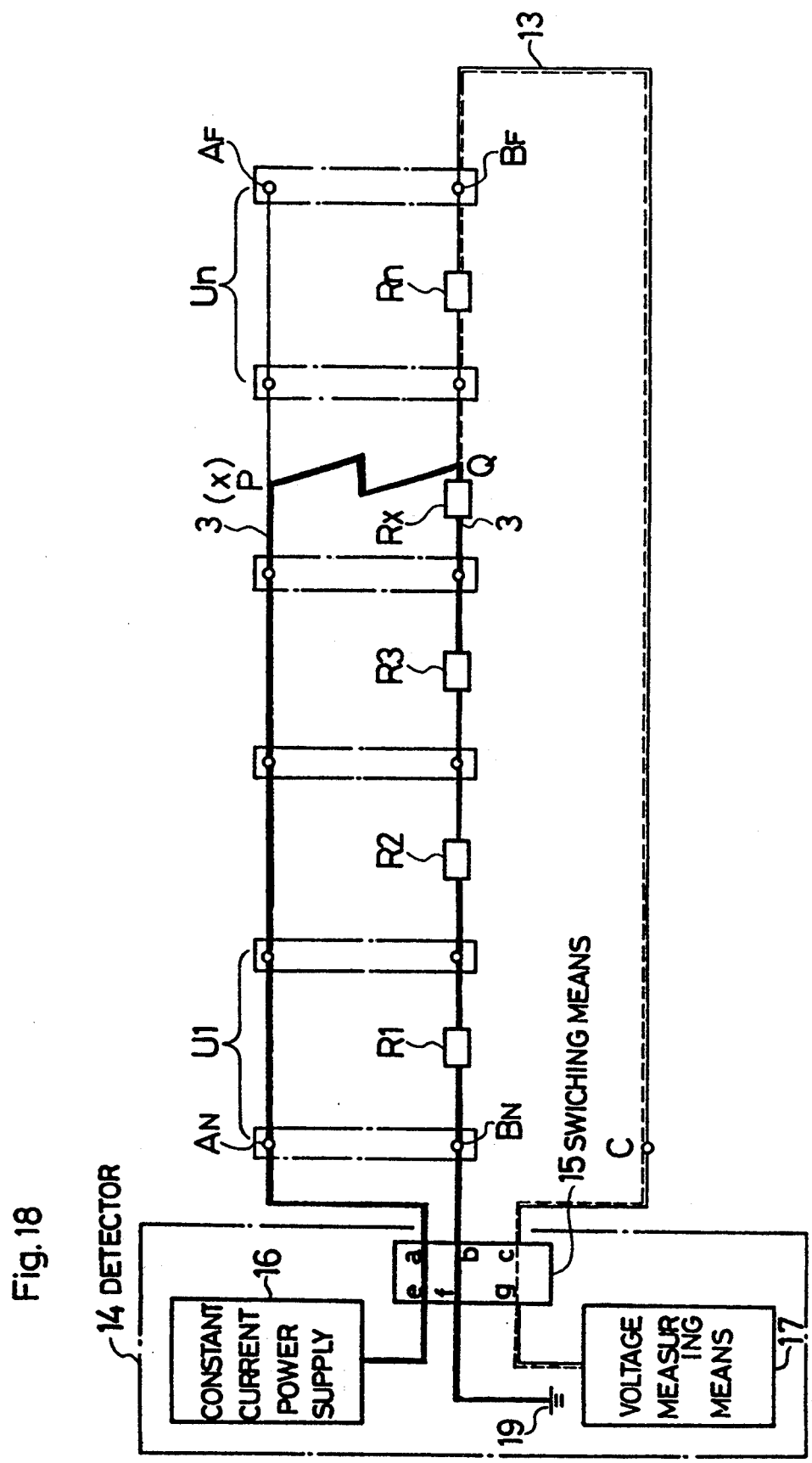
FIG. 18 is a drawing illustrating detection of the location of liquid leakage from the near-end terminal of a liquid leakage detector line.
Figure 19:
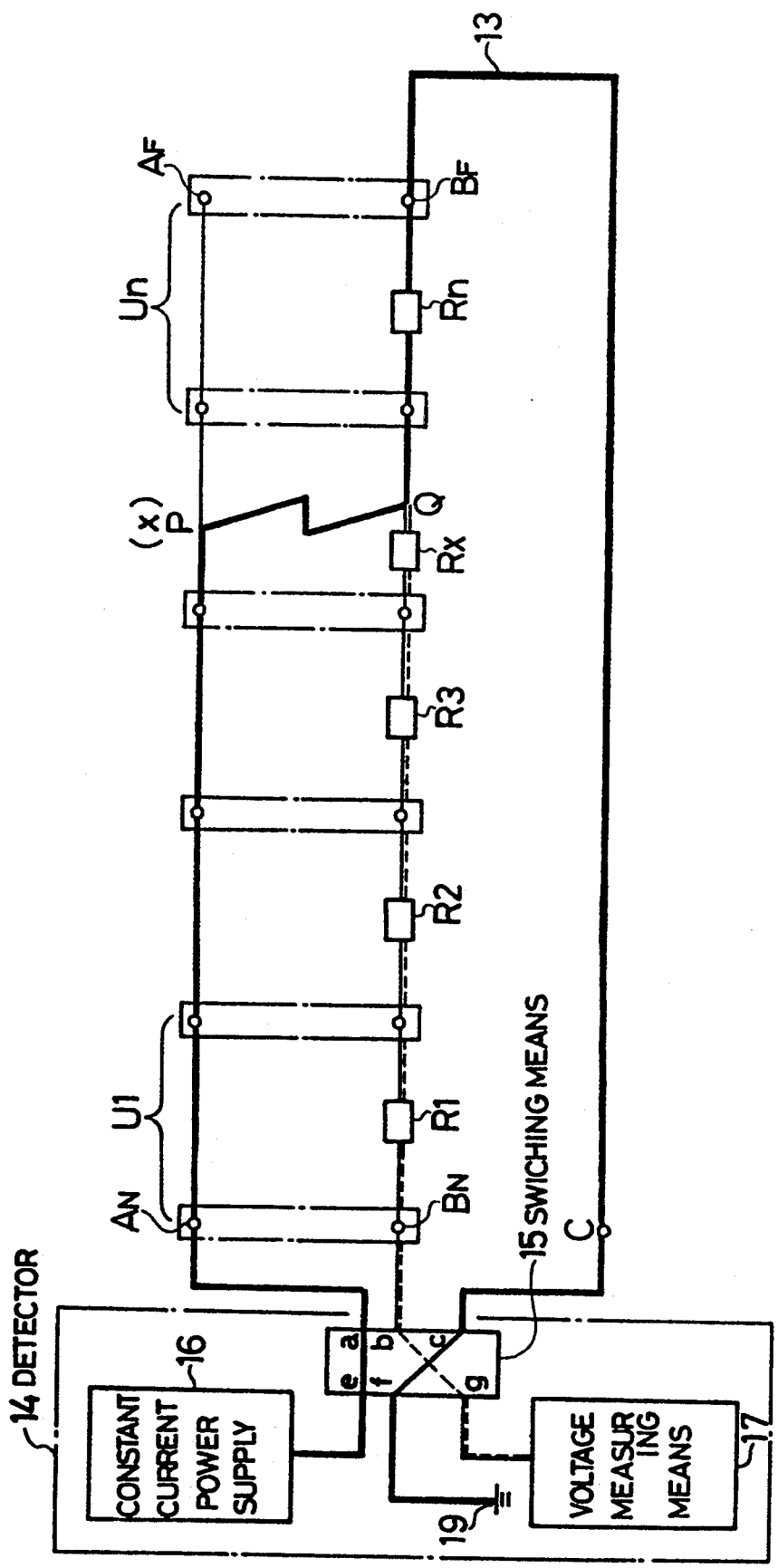
FIG. 19 is a drawing illustrating detection of liquid leakage from the far-end terminal.

An explanation will now be given regarding detection of the location of liquid leakage using the liquid leakage detector line described above, with reference to FIGS. 18 and 19. FIG. 18 shows voltage measuring means from the near end, and FIG. 19 shows one from the far end. Here, a case is shown where liquid leakage occurs at points P and Q (the "x" th unit detector line U) between wiry electrodes 3, 3 which have a near end $A_N$, $B_N$, and a far end $A_F$, $B_F$. Referring to FIG. 4, when contacts a and e, b and f, and c and g are connected by switching means 15, a short circuit of fixed current i is formed which reaches the earth 19 from a constant current power supply 16 via $A_N \rightarrow P \rightarrow Q \rightarrow B_N$, shown by the thick solid line. Also, at point Q, voltage is applied to correspond to the number of resistors R from that point to the near end $B_N$, and the voltage is measured from $B_F \rightarrow C$, as shown by the dotted line, with voltage measuring means 17. Supposing that there is a total of n number of unit detector lines U connected, if liquid leakage occurs in the "x"th line from the near end $B_N$, with resistance r of the resistors R and current value i, then the voltage drop Vx between $B_N$ - Q is measured using the following equation:

$$Vx = i \times r \times x \quad (1)$$

on the assumption that each resistor R (R1, R2, R3 ... Rn) is provided at the near end of each unit detector line. The voltage drop $i \times r$ of one unit detector line U is already known, and thus using the size of the voltage drop Vx, it is possible to determine the number x of the unit detector line U at which the leakage of liquid is occurring.

Nevertheless, the resistance r of the resistors R varies with the temperature, causing errors in the determination of the number x of the unit detector line U at which leakage of liquid is occurring, depending on the outside temperature. In order to cancel out such errors, the line is made so that the voltage drop over the detector line from point Q to the far end $B_F$ may be measured, as shown in FIG. 19. That is, when contacts a and e, b and g, and c and f are connected by the switching means 15, a short circuit of the constant current i is created from the constant current power supply 16 to the earth 19 via $A_N \rightarrow P \rightarrow Q \rightarrow B_F \rightarrow C$, as shown by the thick solid line. Also, a voltage is applied at point Q corresponding to the number of resistors R to the far end $B_F$, and that voltage is measured by the voltage measuring means 17 via $B_N$, as shown by the dotted line. The voltage drop Vy between Q - $B_F$ is measured using the following equation:

$$Vy = i \times r \times (n-x) \quad (2)$$

Combining Equations 1 and 2 to obtain the equation:

$$x = n \times (Vx/(Vx + Vy)) \quad (3)$$

it is possible make a measurement eliminating the influence of temperature variations on the resistance values r of the resistors R.

The above mentioned power supply for measurement of the site of liquid leakage may be either direct current or alternating current, but care must be taken so that there is no influence by polarization of the insulator of the wiry electrodes, if direct current is used, and so that no unbalance is created in the proportional relationship between the measured length and the voltage drop value due to influence from impedance or capacitance, if alternating current is used.

In addition, if each of the resistors R (R1, R2, R3 ... Rn) is arranged at the far end of each of the unit detector lines, it is easy to imagine that the value x is equal to the value of the right-hand side of Equation 3 mentioned above plus one.

Figure 20:
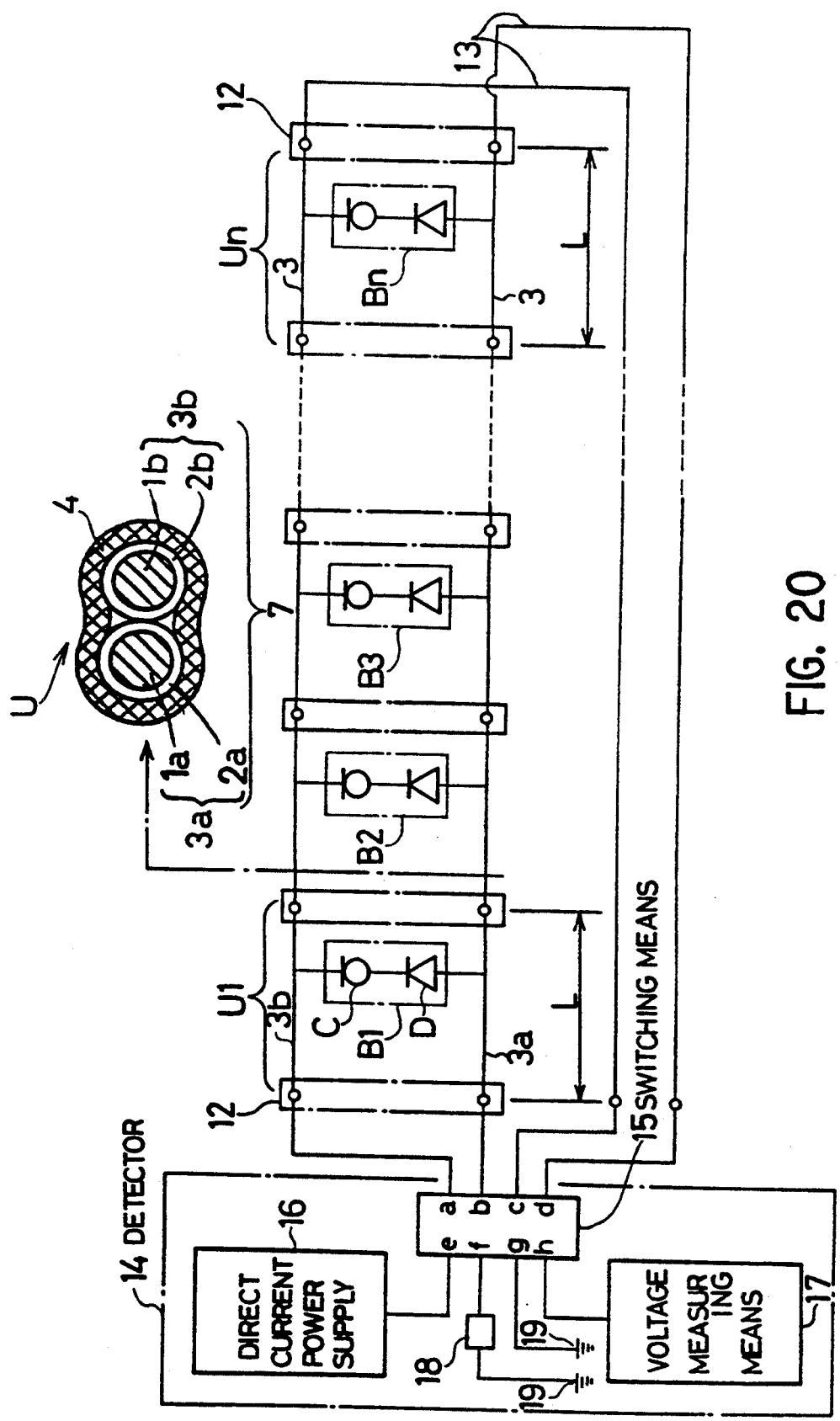
FIG. 20 is an illustration of a liquid leakage detector line according to the present invention which can readily detect the location both of liquid leakage and wire breakage.

An explanation will now be given regarding a different example of the present invention which is capable of detecting both the location of liquid leakage and the location of breakage, with reference to FIG. 20. In FIG. 20, the liquid leakage detector line possesses a specified number n of unit detector lines U ($U_1$ - $U_n$) of specified length L, connected at connectors 12, and if necessary, a connecting line 13 is connected at the end of each unit detector line U. 14 represents a detector, which is constructed so that a constant current power supply 16, voltage measuring means 17, an earth 19 and a standard resistor 18 leading to the earth 19 are connected to switching means 15 possessing contacts a-h.

The unit detector line U may be any one according to the examples of the present invention, but basically comprises a braided body layer 4 around the periphery of a core 9 consisting of a pair of wiry electrodes 3 each consisting of a conductor 1 coated with an insulator 2, arranged parallel to each other or twisted around each other. Also, constant current circuits B ($B_1$ - $B_n$) are connected to allow a specified current to flow between the conductor 1a of one wiry electrode and the conductor 1b of the other wiry electrode of each unit detector line U ($U_1$ - $U_n$). These constant current circuits B consist of diodes D and constant current elements C joined in series.

This differs from the Example according to the present invention shown in FIG. 16 in that the constructions of the above mentioned unit detector lines U are different, and it requires 2 connecting lines 13, is otherwise identical to the Example in FIG. 16.

Similar to the Example in FIG. 16, the two connecting lines 13 connected to the far ends of the wiry electrodes 3 consist of annealed copper wire, or another flexible conductor, coated with an insulator which is waterproof and insoluble in the liquid to be detected, for example, polyethylene or polypropylene. The connecting lines 13 may form the core together with the wiry electrodes 3, and be coated with the same braided body layer 4, or it may have a construction similar to that of conventional single-core wire, installing it along the braided body layer 4 which coats the wiry electrodes 3 or wiring it by a different route than the wiry electrode 3.

Figure 21:
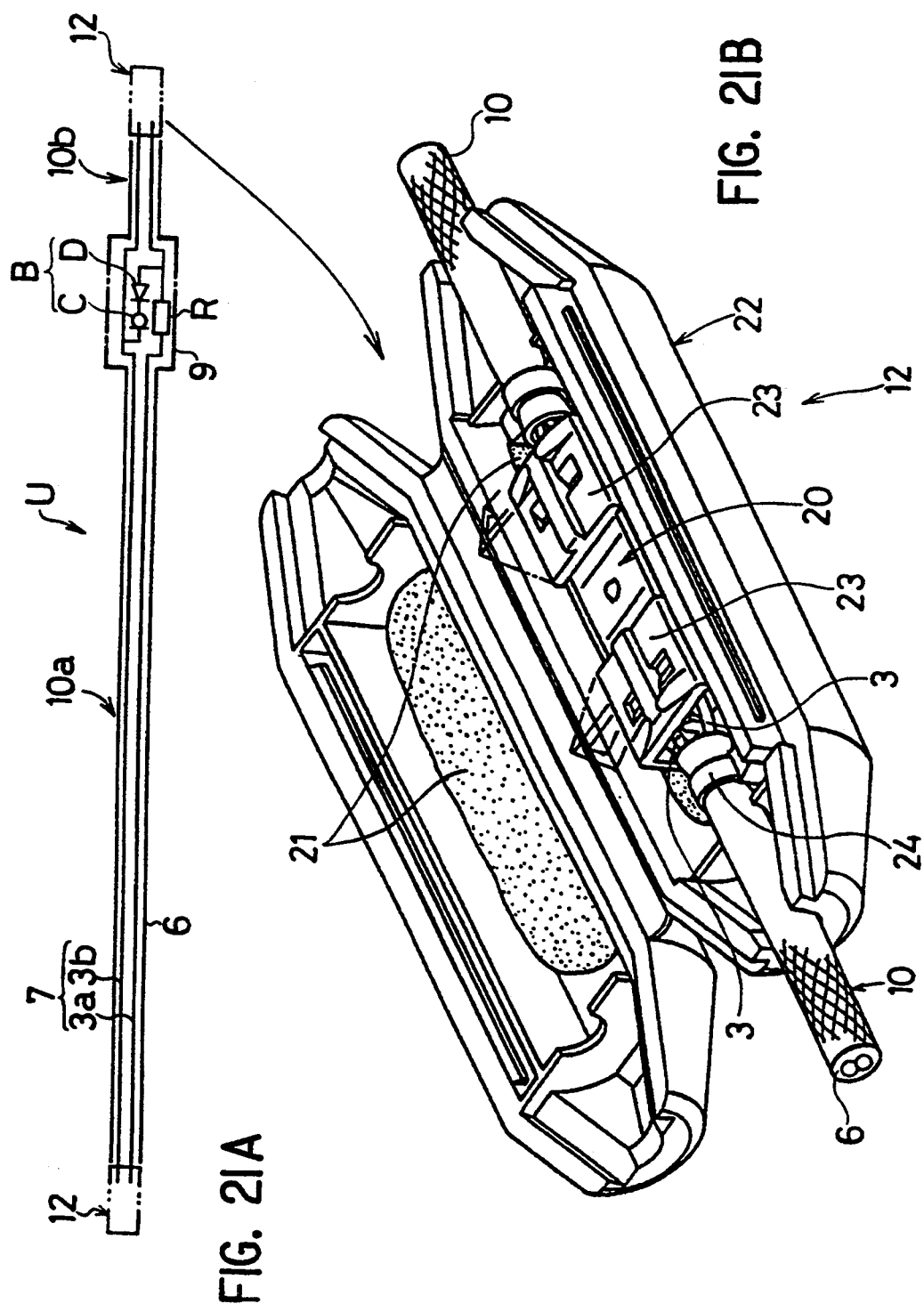
FIG. 21 is a construction drawing of a unit detector line constructed in a liquid leakage detector line, and a connection thereof.
Figure 22:
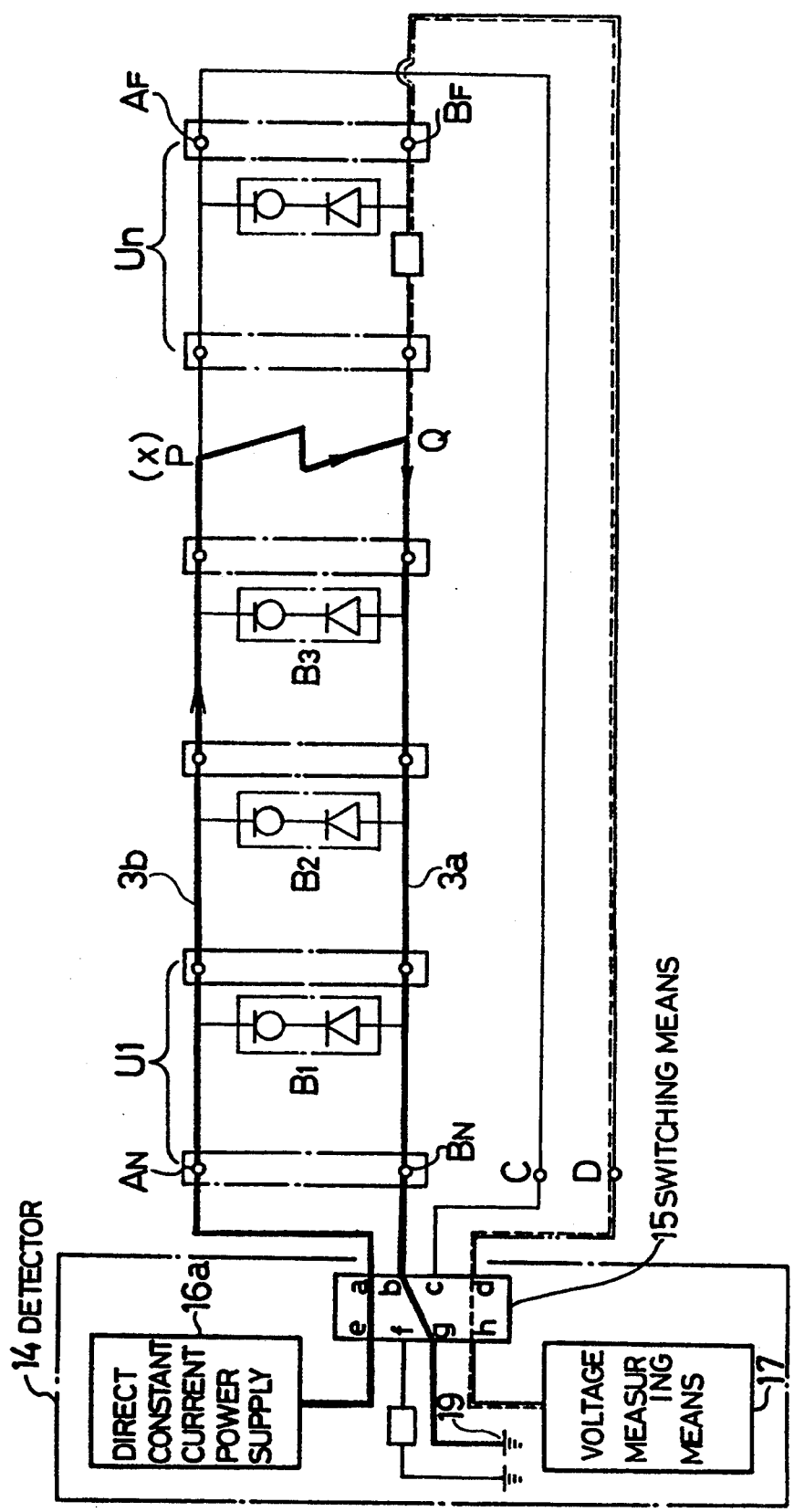
FIG. 22 is a drawing illustrating detection of the location of liquid leakage from the near-end terminal of a liquid leakage detector line.
Figure 23:
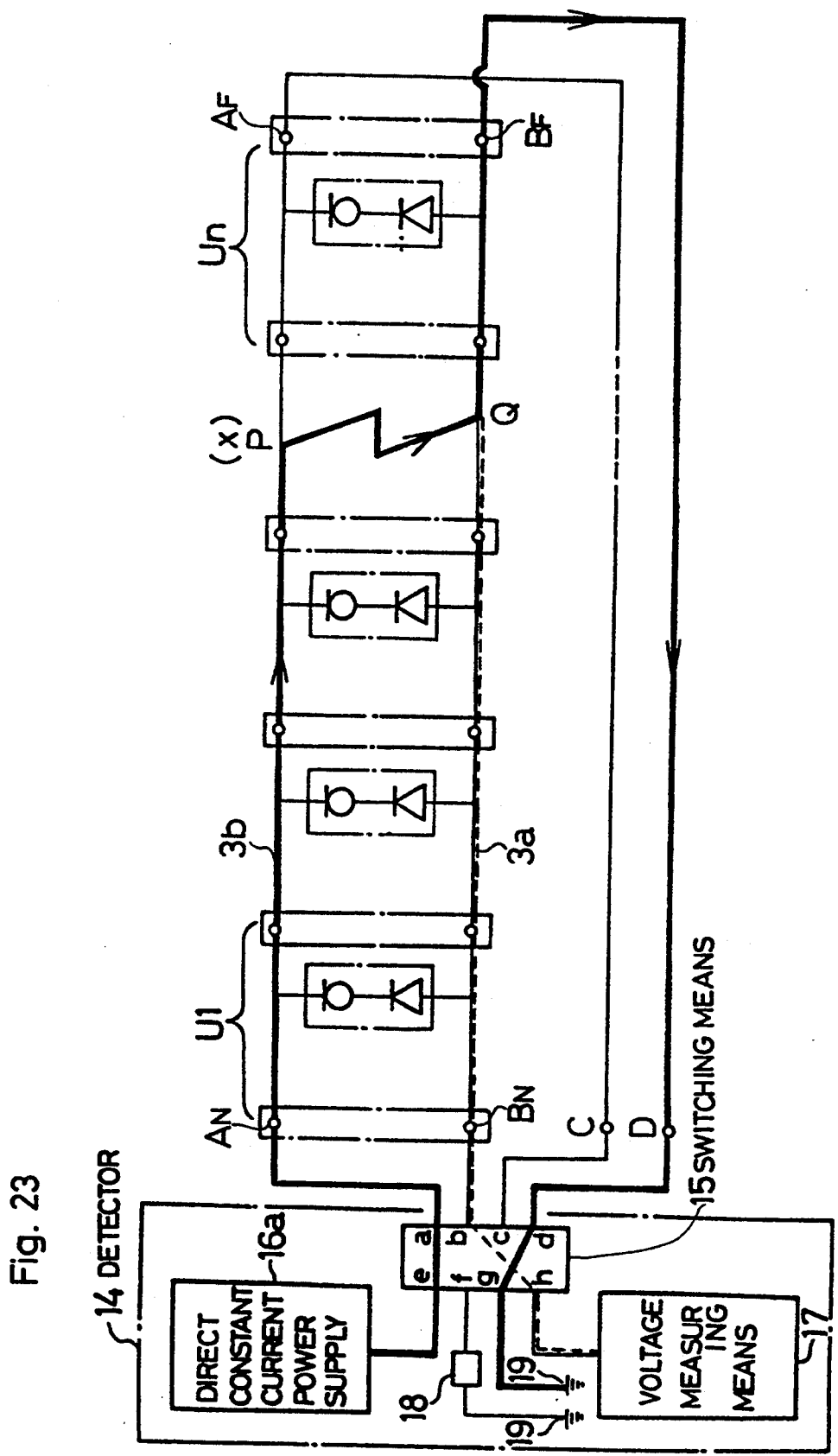
FIG. 23 is a drawing illustrating detection of liquid leakage from the far-end terminal.

A concrete explanation will now be given regarding the construction of unit detector lines U with no connecting line 13 in the core, with reference to FIG. 21. An element connector box T is provided midway between the detector lines 10a, 10b which is composed of a core 7 comprising a pair of wiry electrodes 3 which are coated with a braided body layer 4. For example, if the entire length of the unit detector line U is 20 m, then it is separated into a sensing line 10a of 19 m and a sensing line 10b of 1 m. The element connector box T is miniaturized as much as possible, and a contains constant current circuit B consisting of diodes D and constant current elements C, in such a manner that the desired unit detector line U may be obtained by simply connecting the ends of the wire bodies 10a, 10b to the element connector box T. A plurality of such unit detector lines U are installed along the pipeline in connection to the connectors 12, in such a way that the constant current circuits have equal polarity. The connecting procedure and the connectors used therein are the same as in the Example of the present invention shown in FIG. 16. An explanation will now be given regarding detection of the site of liquid leakage using the liquid leakage detector line described above, with reference to FIGS. 22 and 23. FIG. 22 shows voltage measuring procedures from the near end, and FIG. 23 shows voltage measuring procedures from the far end. Here, a case is shown where liquid leakage occurs at points P and Q (the "x"th unit detector line U) between wiry electrodes 3a, 3b which have a near end $A_N$, $B_N$, and a far end $A_F$, $B_F$. A direct current power supply 16 is built-in so as to allow switching between direct constant current power supply 16a and direct constant current power supply 16b. In FIGS. 22 and 23, connection is made to the direct constant current power supply 16a. When connected in this manner, the wiry electrode 3b is upcurrent from the wiry electrode 3a, and therefore its polarity is opposite to that of each of the constant current circuits B (B1, B2, B3, ... Bn), and current cannot flow thorough each of the constant current circuits B (B1, B2, B3, ... Bn). In FIG. 22, when contacts a and e, b and g, and d and f are connected by the switching means 15, a short circuit of fixed current i is formed which reaches the earth 19 from the fixed current power supply 16a via $A_N \rightarrow P \rightarrow Q \rightarrow B_N$, as shown by the thick solid line. Also, at point Q, voltage is applied to correspond to the resistance value from that point to the near end $B_N$, and the voltage is measured from $B_F \rightarrow D$, as shown by the dotted line, with the voltage measuring means 17.

Supposing that there is a total of n number of unit detector lines U connected, if liquid leakage occurs in the "x"th line from the near end $B_N$, with resistance r of the conductor 1a of the wiry electrode 3a of the unit detector line and current value i flowing to the conductor 1a, then the voltage drop Vx between $B_N$ - Q is measured using the following equation:

$$Vx = i \times r \times x \tag{4}$$

The voltage drop i×r of one unit detector line U is already known, and thus using the size of the voltage drop Vx, it is possible to determine the site of liquid leakage. That is, if x is calculated to 5.5 using the above equation, then the site of liquid leakage is at the center of the 6th line.

Incidentally, the resistance r of the conductor 1a of each unit detector line varies with the temperature, causing errors in the determination of the number x of the unit detector line U at which leakage of liquid is occurring, depending on the outside temperature. In order to cancel out such errors, the line is made so that the voltage drop over the detector line from point Q to the far end $B_F$ may be measured, as shown in FIG. 23. That is, when contacts a and e, b and h, and d and g are connected by the switching means 15, a short circuit of the constant current i is created from the constant current power supply 16 to the earth 19 via $A_N \rightarrow P \rightarrow Q \rightarrow B_F \rightarrow D$, as shown by the thick solid line. Also, a voltage is applied at point Q corresponding to the number of resistors R to the far end $B_F$, and that voltage is measured by the voltage measuring means 17 via $B_N$, as shown by the dotted line. The voltage drop Vy between Q - $B_F$ is measured using the following equation:

$$Vy = i \times r \times 33 \, (n - x) \tag{5}$$

Combining Equations 1 and 2 to obtain the equation:

$$x = n \times (Vx/(Vx + Vy)) \tag{6}$$

it is possible make a measurement eliminating the influence of temperature variations on the resistance values r of the conductor 1a of each unit detector line, if Vx and Vy are measured at approximately the same temperature.

Figure 24:
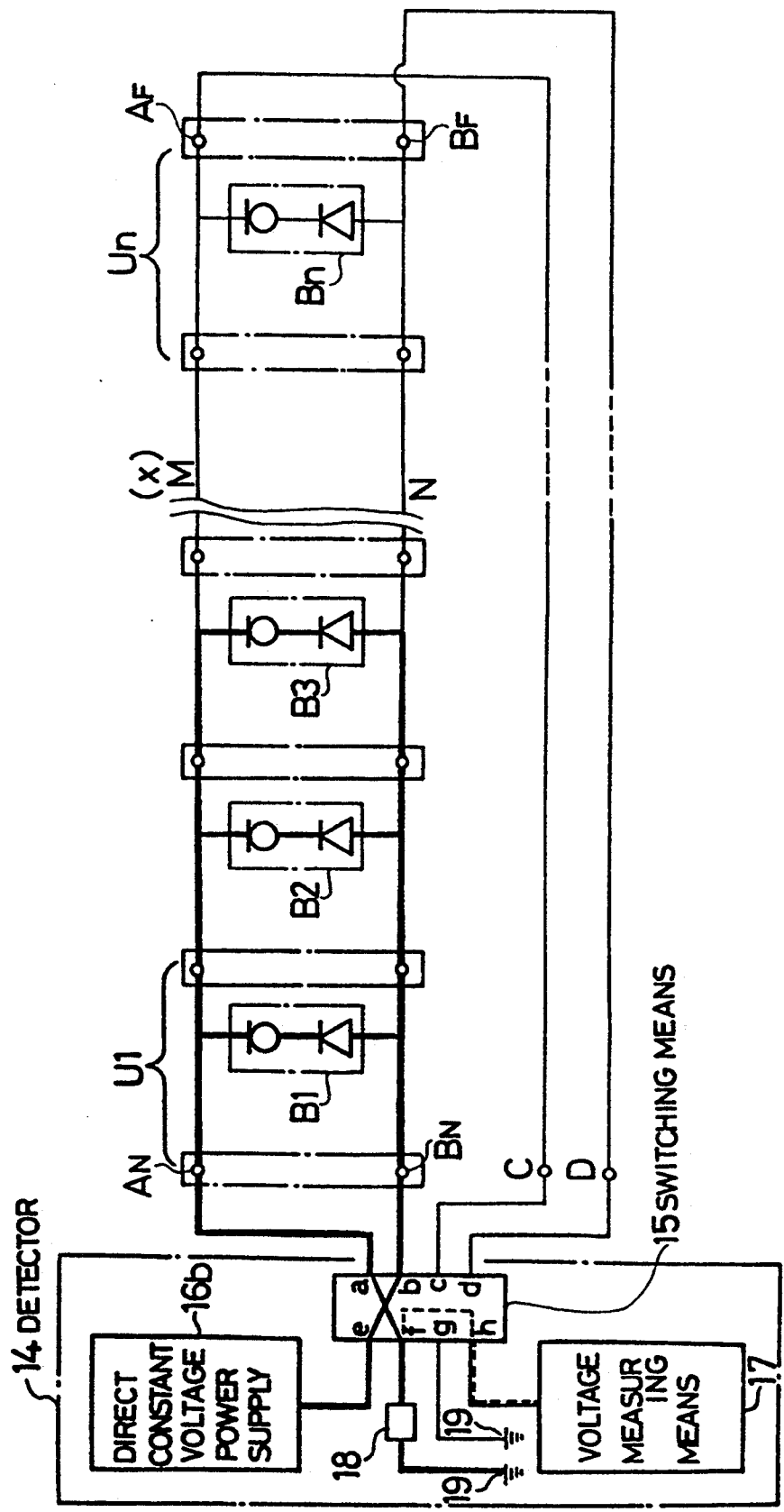
FIG. 24 is a drawing illustrating detection of the location of wire breakage from the near-end terminal of a liquid leakage detector line.
Figure 25:
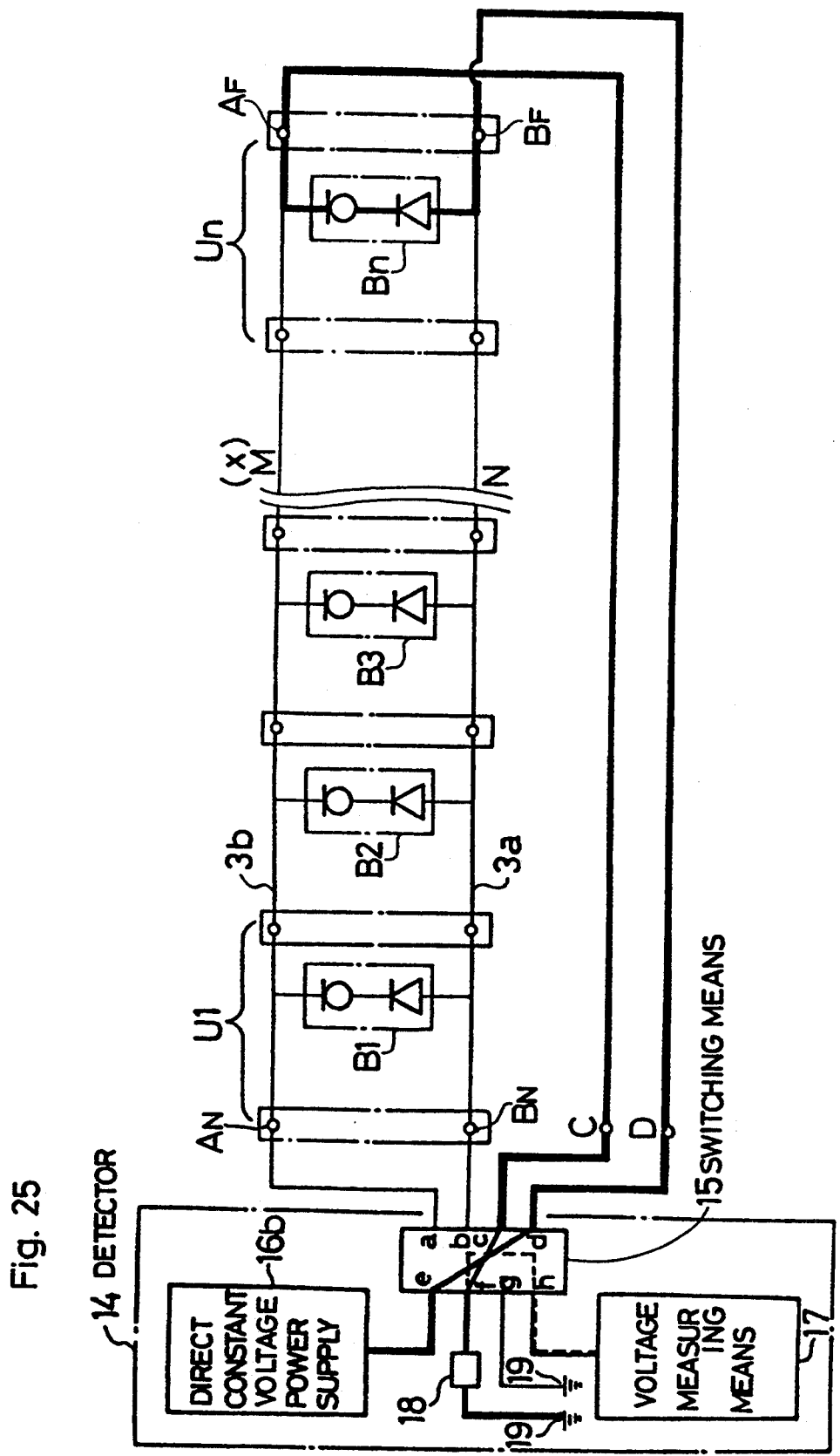
FIG. 25 is a drawing illustrating detection of wire breakage from the far-end terminal.
Figure 26:
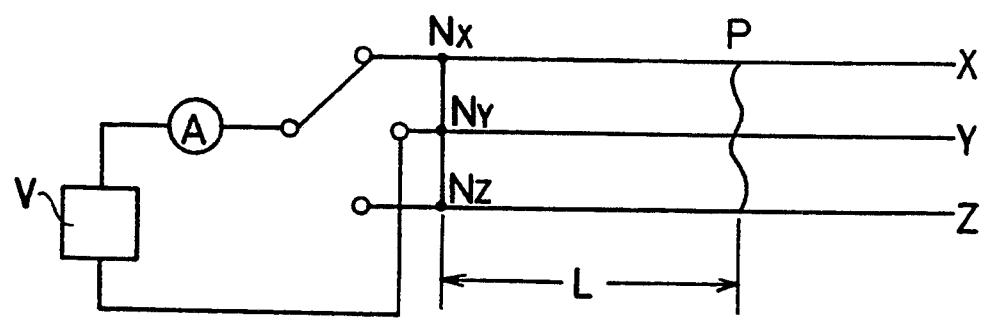
FIG. 26 is a drawing illustrating a conventional liquid leakage detector line capable of detecting the location of liquid leakage.
Figure 27:
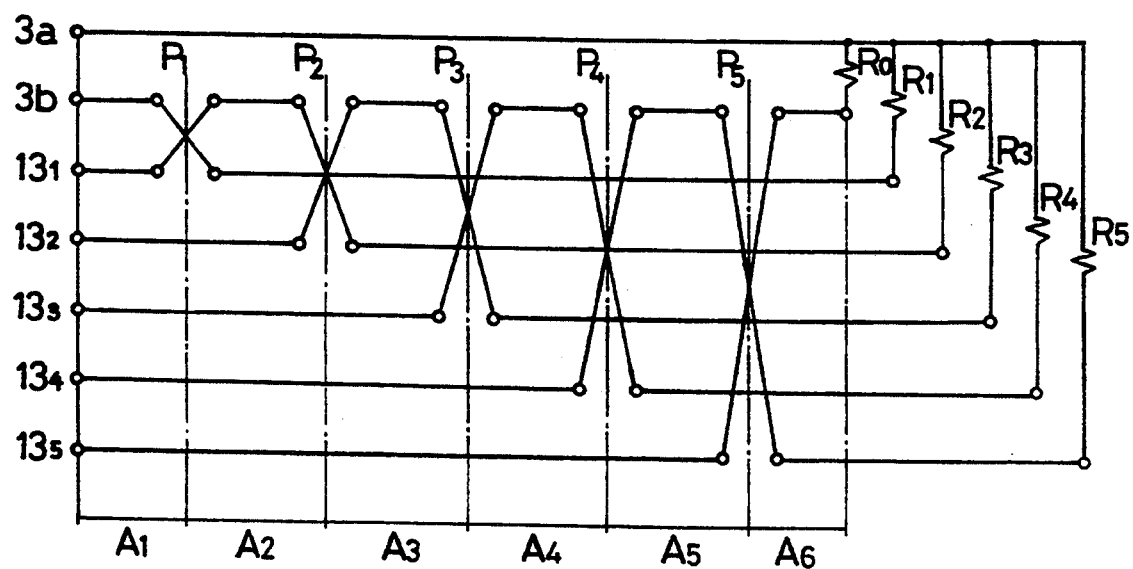
FIG. 27 is a drawing illustrating a conventional liquid leakage detector line capable of detecting the location of liquid leakage and wire breakage.

An explanation will now be given regarding detection of the site of breakage of a liquid leakage detector line, with reference to FIGS. 24 and 25. FIG. 24 shows voltage measuring procedures from the near end, and FIG. 25 shows voltage measuring procedures from the far end. Here, a case is shown where breakage occurs at points M and N between wiry electrodes 3a, 3b at the "x"th unit detector line. In FIGS. 24 and 25, the constant current power supply 15 is switched to the direct constant voltage power supply 16b. In FIG. 24, when contacts a and f, b and e, and f and h are connected by the switching means 15, a short circuit of fixed current I is formed by the constant current circuit B between the section from the constant current power supply 16 to just before $B_N \rightarrow N$, and the section from the standard resistor 18 to the earth 19 via the section from just before $M \rightarrow A_N$, as shown by the thick solid line. Also, at contact f of the switching means 15, voltage is applied to correspond to the number of constant current circuits B from that point to the near end $A_F$, and the voltage is measured from contact f to contact h, as shown by the dotted line, with a voltage measuring means 17. Suppose that each constant current circuit B is connected to the far end of each unit detector line U. A total of n number of unit detector lines U is connected thereto, and if breakage occurs in the "x"th unit detector line from the near end $B_N$, with resistance R of the standard resistor 18 and current value I of the constant current circuit B, then the voltage drop Wx at contact f is measured using the following equation:

$$Wx = I \times R \times (x - 1) \tag{7}$$

The voltage drop I×R of one unit detector line U is already known, and thus using the size of the voltage drop Wx, it is possible to determine the number x of the unit detector line U for the site of breakage.

However, the current value I of the constant current circuit B varies with the temperature, causing errors in the determination of the number x of the unit detector line U at which breakage is occurring, depending on the outside temperature. In order to cancel out such errors, the line is made so that the unit detector line U at the far end may measure the voltage drop, as shown in FIG. 25. That is, when contacts c and f, d and e, and f and h are connected by the switching means 15, a short parallel circuit of constant current I is created by the constant current circuit B between the section from the constant current power supply 16 to just before D→B$_F$→N, and the section from the standard resistor 18 to the earth 19 via the section from just before M→A$_F$→C, as shown by the thick solid line. Also, a voltage is applied at contact f of the switching means 15 corresponding to the number of constant current circuits B from the far end to the site of breakage, and that voltage is measured by the voltage measuring means 17 via contact f contact h, as shown by the dotted line. The voltage drop Wy at contact f is measured using the following equation:

$$Wy = I \times R \times (n - x + 1) \quad (8)$$

Combining Equations 10 and 11 to obtain the equation:

$$x = n \times (Wx/(Wx + Wy)) + 1 \quad (9)$$

it is possible make a measurement eliminating the influence of temperature variations on the current value I of the constant current circuit B. However, if each constant current circuit B is installed at the near end of each unit detector line U, then it is easy to imagine that the value x is equal to the value of the right-hand side of Equation 12 minus one.

In the Examples of the present invention described above, if the conductor 1a of one wiry electrode 3a is provided with high-resistance wire having a comparatively high resistance value per unit length, and the conductor 1b of the other wiry electrode 3b is provided with low-resistance wire having a comparatively low resistance per unit length, and the upcurrent side of the constant current circuits B (B1, B2, B3, . . . Bn) are connected to the above mentioned high-resistance wire 1a, then the value of the voltage drop from the near end or the far end to the site of liquid leakage will become larger, and the sensitivity of measurement will be thus improved. Also, if, in place of the high resistance wire 1a, resistance elements are connected at every specified distance along an annealed copper wire or other flexible conductor of low resistance per unit length, then there will be no loss bendability or flexibility of the liquid leakage detector line.

What is claimed is:

1. A liquid leakage detector line provided with a coating layer disposed at the outer periphery of a core, the core containing a pair of wiry electrodes having an extrusion coating disposed nearly parallel with each other, characterized in that said wiry electrodes are formed with conductors which have the extrusion coating of a thermoplastic polyester elastomer thereon as the insulator thereof, and in that the coating layer possesses waterproof and liquid-absorbent properties.

2. A liquid leakage detector line according to claim 1, characterized in that the coating layer is a braided body layer consisting of only waterproof and liquid-absorbent yarn.

3. A liquid leakage detector line according to claim 1, characterized in that the coating layer is a braided body layer consisting of an alternating pattern of a group of yarn which is insoluble in the liquid to be detected and non-absorbent, and a group of yarn which is soluble in the liquid to be detected and liquid-absorbent.

4. A liquid leakage detector line provided with successive coatings of an inner layer and an outer layer around the outer periphery of a core, the core containing a pair of wiry electrodes having an extrusion coating disposed nearly parallel with each other, characterized in that the wiry electrodes are formed with conductors which have the extrusion coating of a thermoplastic polyester elastomer thereon as the insulator thereof, and in that the outer layer possesses waterproof and liquid-absorbent properties.

5. A liquid leakage detector line according to claim 4, characterized in that the inner layer is a braided body layer consisting of yarn which is insoluble in the liquid to be detected and non-absorbent.

6. A liquid leakage detector line according to claim 4, characterized in that the inner layer is a braided body layer consisting of an alternating pattern of a group of yarn which is insoluble in the liquid to be detected and nonabsorbent, and a group of yarn which is soluble in the liquid to be detected and liquid-absorbent.

7. A liquid leakage detector line according to any one of claims 1–6, characterized by being provided with a spacer which consists of a member which is soluble in the liquid to be detected, and maintains a minute gap between said pair of wiry electrodes.

8. A liquid leakage detector line according to claim 7, characterized in that said spacer consists of a cord which is soluble in the liquid to be detected, and is surrounded by said pair of wiry electrodes, and a pair of inclusion cords having an outside diameter roughly equal to that of the wiry electrodes, creating a nearly circular core twisted into a star shape.

9. A liquid leakage detector line according to claim 7, characterized in that said spacer consists of tape which is waterproof and soluble in the liquid to be detected wound around at least one of said wiry electrodes.

10. A liquid leakage detector line, comprising: a pair of wiry electrodes having a flexible conductor with an extrusion coating of a thermoplastic polyester elastomer, an outer-layer coating possessing at least liquid-absorbent properties around a core which contains the pair of wiry electrodes, and a series of impedance elements each connected at a certain specified length to one of the wiry electrodes.

11. A liquid leakage detector line according to claim 10, characterized in having a required number of unit detector lines with each one of the series of impedance elements connected to a respective one of the unit detector lines and connected to one of the wiry electrodes at a specified length.

12. A liquid leakage detector line according to claim 10 or 11, characterized in that said core contains a connecting line consisting of a flexible conductor insulated with an insulator which is waterproof and insoluble in the liquid to be detected, and connected to one end of the wiry electrode to which said series of impedance elements is connected.

13. A liquid leakage detector line, comprising: a pair of wiry electrodes having a flexible conductor with an extrusion coating of a thermoplastic polyester elastomer, a coating layer possessing at least liquid-absorbent properties around a core which contains the pair of wiry electrodes, and constant current circuits which cause a specified current to flow in the same direction from one wiry electrode to the other wiry electrode, each respectively connected in a parallel manner at a certain specified length to the wiry electrodes.

14. A liquid leakage detector line according to claim 13, characterized in that the conductor of one wiry electrode is a high-resistance wire having a comparatively high resistance value, and the conductor of the other wiry electrode is a low-resistance wire having a comparatively low resistance value, and in that the upcurrent end in the direction of the order of said constant current circuits is connected to said high-resistance wire end.

15. A liquid leakage detector line according to claim 14, characterized in that the high-resistance wire has a plurality of resistance elements each respectively connected to a flexible conductor at a certain specified length.

16. A liquid leakage detector line according to any one of claims 13–15, characterized in that at least one resistance element is connected to one of the wiry electrodes at a certain specified length, and a required number of unit detector lines, having constant current circuits connected thereto, are connected between the wiry electrodes in such a way that the polarities of the constant current circuits are in the same direction.

17. A liquid leakage detector line according to claim 16, characterized in that said core contains a pair of connecting lines having flexible conductors insulated with an insulator which is waterproof and insoluble in the liquid to be detected, and each respectively connected to one end of one of said pair of wiry electrodes.

18. A liquid leakage detector line according to any one of claims 13–15, characterized in that said core contains a pair of connecting lines having flexible conductors insulated with an insulator which is waterproof and insoluble in the liquid to be detected, and each respectively connected to one end of one of said pair of wiry electrodes.

* * * * *